US012609822B2

(12) United States Patent
Potlapally et al.

(10) Patent No.: US 12,609,822 B2
(45) Date of Patent: Apr. 21, 2026

(54) ACCESSING CLOUD ENVIRONMENTS THROUGH ADMINISTRATIVE TENANCIES TO COMPLY WITH SOVEREIGNTY REQUIREMENTS

(71) Applicant: Oracle International Corporation, Redwood Shores, CA (US)

(72) Inventors: Nachiketh Rao Potlapally, Seattle, WA (US); Christian A. Linacre, Fall City, WA (US); Apurv Awasthi, Woodinville, WA (US); Harsh Aseeja, Kirkland, WA (US); Qingyang Luo, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 18/649,585

(22) Filed: Apr. 29, 2024

(65) Prior Publication Data

US 2024/0364689 A1 Oct. 31, 2024

Related U.S. Application Data

(60) Provisional application No. 63/462,880, filed on Apr. 28, 2023.

(51) Int. Cl.
H04L 9/08 (2006.01)
H04L 9/40 (2022.01)
H04L 67/10 (2022.01)

(52) U.S. Cl.
CPC ............ H04L 9/0891 (2013.01); H04L 63/10 (2013.01); H04L 63/102 (2013.01); H04L 63/20 (2013.01); H04L 67/10 (2013.01)

(58) Field of Classification Search
CPC ..... H04L 9/0891; H04L 63/10; H04L 63/102; H04L 63/20; H04L 67/10
(Continued)

(56) References Cited

U.S. PATENT DOCUMENTS 9,092,502 B1 7/2015 Cannaliato et al.
9,306,814 B1 4/2016 Roth et al.
(Continued)

FOREIGN PATENT DOCUMENTS

EP 2893685 B1 7/2017
EP 3429156 A1 1/2019
(Continued)

OTHER PUBLICATIONS

"Create a Reseller and Reseller Administrator User", Retrieved from https://abiquo.atlassian.net/wiki/spaces/ABI54/pages/310740667/ Create+a+Reseller+and+Reseller+Administrator+User, May 3, 2022, pp. 1-5.
(Continued)

*Primary Examiner* — Teshome Hailu
(74) *Attorney, Agent, or Firm* — Invoke

(57) ABSTRACT

Techniques for providing user access to cloud environments through an administrative tenancy to comply with sovereignty requirements are disclosed. The administrative tenancy is one of multiple tenancies in the cloud environment. The administrative tenancy includes tools for communicating with services running outside of the administrative tenancy. The user may only be able to access these services through the administrative tenancy. User access to the administrative tenancy requires the user to satisfy one or more sovereignty requirements. After determining that the user satisfies the sovereignty requirements for the cloud
(Continued)

environment, the system grants the user access to the tools within the administrative tenancy to communicate with services outside the administrative tenancy.

18 Claims, 13 Drawing Sheets

(58) Field of Classification Search
USPC ........................................................... 726/1
See application file for complete search history.

(56) References Cited

U.S. PATENT DOCUMENTS

| | | | |
|---|---|---|---|
| 9,438,599 B1 | 9/2016 | Yuhan et al. | |
| 9,722,895 B1 | 8/2017 | Sarukkai et al. | |
| 9,985,947 B1 | 5/2018 | Elhard | |
| 10,757,574 B1 | 8/2020 | Rule et al. | |
| 10,878,483 B1 | 12/2020 | Felbinger et al. | |
| 11,552,953 B1 | 1/2023 | Avadhanam | |
| 11,720,536 B1 | 8/2023 | Kisser et al. | |
| 2002/0198973 A1 | 12/2002 | Besaw | |
| 2003/0154407 A1 | 8/2003 | Kato et al. | |
| 2010/0212004 A1 | 8/2010 | Fu | |
| 2013/0054426 A1 | 2/2013 | Rowland et al. | |
| 2013/0297711 A1* | 11/2013 | Nhu ...................... | G06F 15/163 |
| | | | 709/204 |
| 2013/0304925 A1 | 11/2013 | Ferris et al. | |
| 2014/0280595 A1* | 9/2014 | Mani ...................... | H04L 67/10 |
| | | | 709/204 |
| 2015/0363852 A1 | 12/2015 | Vautour | |
| 2016/0043909 A1 | 2/2016 | Pogrebinsky et al. | |
| 2016/0142211 A1 | 5/2016 | Metke et al. | |
| 2016/0277411 A1 | 9/2016 | Dani et al. | |
| 2017/0230229 A1 | 8/2017 | Sasturkar et al. | |
| 2018/0052861 A1 | 2/2018 | Seetharaman et al. | |
| 2018/0219784 A1 | 8/2018 | Jiang et al. | |
| 2018/0234256 A1 | 8/2018 | Bowen | |
| 2019/0087835 A1 | 3/2019 | Schwed et al. | |
| 2019/0156000 A1 | 5/2019 | Hoffmann et al. | |
| 2019/0166007 A1 | 5/2019 | Sundaram et al. | |
| 2019/0205045 A1 | 7/2019 | Hugot et al. | |
| 2020/0014659 A1 | 1/2020 | Chasman et al. | |
| 2020/0112497 A1 | 4/2020 | Yenumulapalli et al. | |
| 2020/0117757 A1 | 4/2020 | Yanamandra et al. | |
| 2020/0358756 A1* | 11/2020 | Rose ................. | H04L 63/0815 |
| 2021/0216190 A1 | 7/2021 | Vakil et al. | |
| 2021/0234864 A1 | 7/2021 | Dube et al. | |
| 2021/0273914 A1 | 9/2021 | Cobb | |
| 2021/0279109 A1 | 9/2021 | Ji et al. | |
| 2021/0377272 A1 | 12/2021 | Dasari et al. | |
| 2021/0392142 A1* | 12/2021 | Stephens .............. | H04L 63/104 |
| 2022/0091947 A1 | 3/2022 | Kothari et al. | |
| 2022/0103618 A1 | 3/2022 | Pinheiro et al. | |
| 2022/0150124 A1 | 5/2022 | Cooley et al. | |
| 2022/0255902 A1 | 8/2022 | Woodson | |
| 2022/0294818 A1 | 9/2022 | Parekh et al. | |
| 2022/0335340 A1 | 10/2022 | Moustafa et al. | |
| 2022/0374271 A1 | 11/2022 | Pogrebinsky et al. | |
| 2023/0109926 A1* | 4/2023 | Nair ...................... | H04L 63/20 |
| | | | 726/25 |
| 2023/0132478 A1 | 5/2023 | Robinson et al. | |
| 2023/0316348 A1 | 10/2023 | Dageville et al. | |
| 2023/0342179 A1 | 10/2023 | Suttle et al. | |
| 2023/0362161 A1 | 11/2023 | Spector et al. | |
| 2023/0385286 A1 | 11/2023 | Glickman et al. | |
| 2024/0054063 A1 | 2/2024 | Wichelman et al. | |
| 2024/0095739 A1 | 3/2024 | Adogla et al. | |
| 2024/0320240 A1 | 9/2024 | Podder | |

FOREIGN PATENT DOCUMENTS

| | | | |
|---|---|---|---|
| EP | 3271857 B1 | 4/2020 | |
| WO | 2014/039921 A1 | 3/2014 | |
| WO | 2018/010791 A1 | 1/2018 | |
| WO | 2021/145894 A1 | 7/2021 | |
| WO | 2021/150306 A1 | 7/2021 | |
| WO | 2021/150307 A1 | 7/2021 | |
| WO | 2021/174104 A1 | 9/2021 | |

OTHER PUBLICATIONS

"General Variables for All Requests", Jun. 28, 2023, pp. 6.

"Overview of Access Approval", Retrieved from https://cloud.google.com/assured-workloads/access-approval/docs/overview, Jun. 6, 2024, pp. 5.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"Policy Syntax", Jan. 4, 2023, pp. 7.

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, pp. 12.

"Verbs", Jun. 5, 2023, pp. 2.

Anonymbus: "Tokenization—(data security)", Wikipedia, Feb. 12, 2023, pp. 1-12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

Ducharme et al., "Seamlessly Protect Your IBM Cloud Application Infrastructure with Privileged Access Gateway", Oct. 3, 2022, pp. 13.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.

Anonymous: "Oracle Cloud Infrastructure Documentation—Security Guide for Exadata Database Service on Cloud@Customer Systems", Apr. 1, 2023, XP093181902.

Anonymous: "Oracle Cloud Infrastructure Documentation-Overview of IAM", Feb. 8, 2023, XP093184083.

Anonymous: "Oracle Cloud Infrastructure Documentation—Renaming a Cloud Account", May 14, 2021, XP093185071.

Anonymous: "Oracle Cloud Infrastructure Documentation-Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

Anonymous: "Oracle Cloud Infrastructure Documentation—Getting Started with Policies", Jan. 4, 2023, XP093184099.

Anonymous: "Oracle Cloud Infrastructure Documentation—Getting Summary Information on the Overview Page", Aug. 16, 2022, XP093183031.

Anonymous: "Oracle Cloud Infrastructure Documentation—Learn Best Practices for Set ting Up Your Tenancy", Feb. 8, 2023, XP093184095.

Anonymous: "Oracle Cloud Infrastructure Documentation—Managing Compartments", Feb. 8, 2023, XP093184098.

Anonymous: "Oracle Cloud Infrastructure Documentation—Monitoring Threats", Sep. 28, 2022, XP093183035.

Anonymous: "Oracle Cloud Infrastructure Documentation—Overview of the Console Dashboards Service", Mar. 14, 2023, XP093184740.

(56) References Cited

OTHER PUBLICATIONS

Anonymous: "Oracle Cloud Infrastructure Documentation—Prerequisites for Oracle Platform Services on Oracle Cloud Infrastructure", Mar. 23, 2023, XP093185058.

Anonymous: "Oracle Cloud Infrastructure Documentation—Welcome to Oracle Cloud Infrastructure", Mar. 23, 2023, XP093182493.

Anonymous: "Oracle Gen 2 Exadata Cloud@Customer Security Controls", Jan. 11, 2023, XP093181973.

Anonymous: "Oracle Operator Access Control Configuration and Administration Guide", Nov. 18, 2022, XP093181896.

Anonymous: "Oracle Public Sector Licensing and Permitting", 2022, XP093184298.

Anonymous: "Oracle Sovereign Cloud", Feb. 15, 2023, XP093184649.

Apps2fusion: "Security Roles in Oracle Fusion Cloud SLA", Nov. 30, 2018, XP093184293.

Magouryrk Clay: "Announcing Oracle Alloy: The power of the cloud in your hands", Oct. 18, 2022, XP093183485.

Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

* cited by examiner

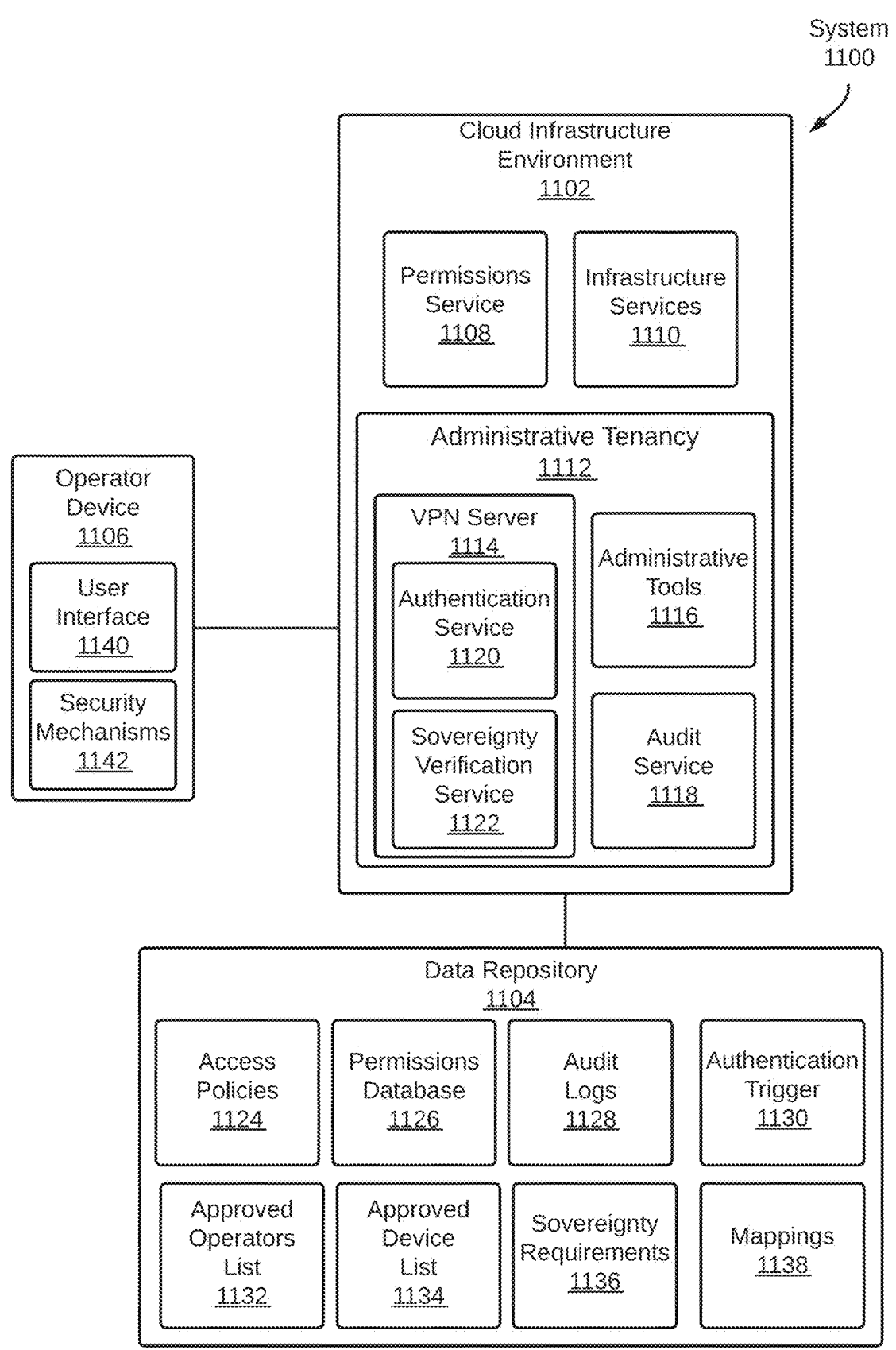

System
1100

Cloud Infrastructure
Environment
1102

Permissions
Service
1108

Infrastructure
Services
1110

Administrative Tenancy
1112

VPN Server
1114

Authentication
Service
1120

Administrative
Tools
1116

Sovereignty
Verification
Service
1122

Audit
Service
1118

Operator
Device
1106

User
Interface
1140

Security
Mechanisms
1142

Data Repository
1104

Access
Policies
1124

Permissions
Database
1126

Audit
Logs
1128

Authentication
Trigger
1130

Approved
Operators
List
1132

Approved
Device
List
1134

Sovereignty
Requirements
1136

Mappings
1138

FIGURE 11A

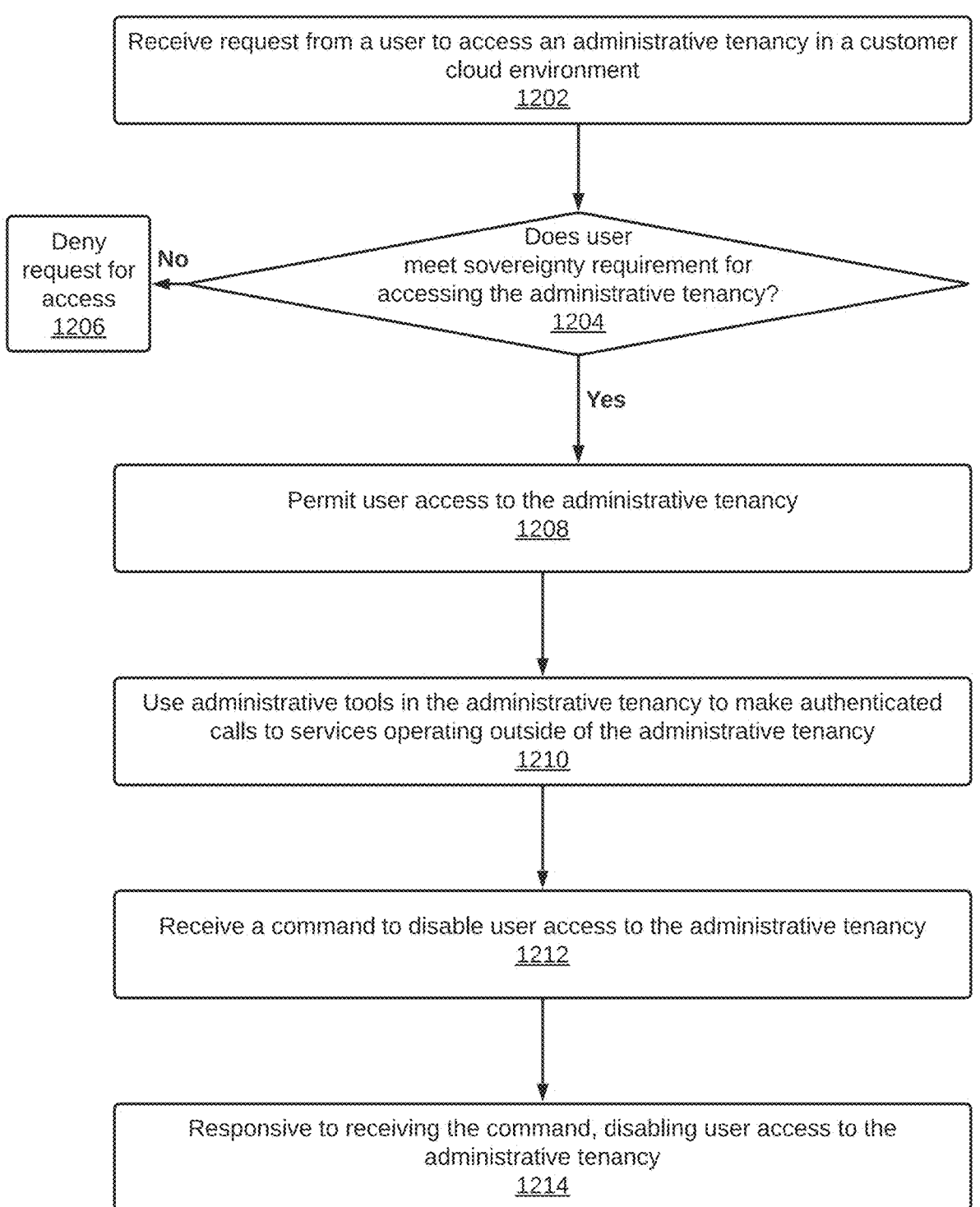

Receive request from a user to access an administrative tenancy in a customer cloud environment
1202

Does user meet sovereignty requirement for accessing the administrative tenancy?
1204

No

Deny request for access
1206

Yes

Permit user access to the administrative tenancy
1208

Use administrative tools in the administrative tenancy to make authenticated calls to services operating outside of the administrative tenancy
1210

Receive a command to disable user access to the administrative tenancy
1212

Responsive to receiving the command, disabling user access to the administrative tenancy
1214

FIGURE 12

ACCESSING CLOUD ENVIRONMENTS THROUGH ADMINISTRATIVE TENANCIES TO COMPLY WITH SOVEREIGNTY REQUIREMENTS

BENEFIT CLAIMS; RELATED APPLICATIONS; INCORPORATION BY REFERENCE

This application claims the benefit of U.S. Provisional Patent Application 63/462,880, filed Apr. 28, 2024, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud environments. More particularly, the present disclosure relates to user access of cloud environments through administrative tenancies to comply with sovereignty requirements.

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premise data center, software application framework, or other information technology infrastructure.

Some entities (e.g., organizations, governments, and other agencies) impose sovereignty requirements on using, transmitting, and/or otherwise accessing certain computing resources. Sovereignty requirements help to ensure compliance with national laws, security standards, and/or strategic interests. In general, sovereignty requirements aim to protect national security, data privacy, and economic interests. For example, some countries impose sovereignty requirements that prohibit the export of certain technologies outside of the country, including via transmissions over computer networks outside of that country. Thus, a sovereignty requirement may require users to be physically present in a specific location or region before permitting access to a particular computing resource.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 11A and 11B illustrate systems for accessing resources in a cloud environment through an administrative tenancy to comply with sovereignty requirements in accordance with one or more embodiments;

FIG. 12 illustrates an example set of operations for accessing resources in a cloud environment through an administrative tenancy to comply with sovereignty requirements in accordance with one or more embodiments.

DETAILED DESCRIPTION

Figure 1:
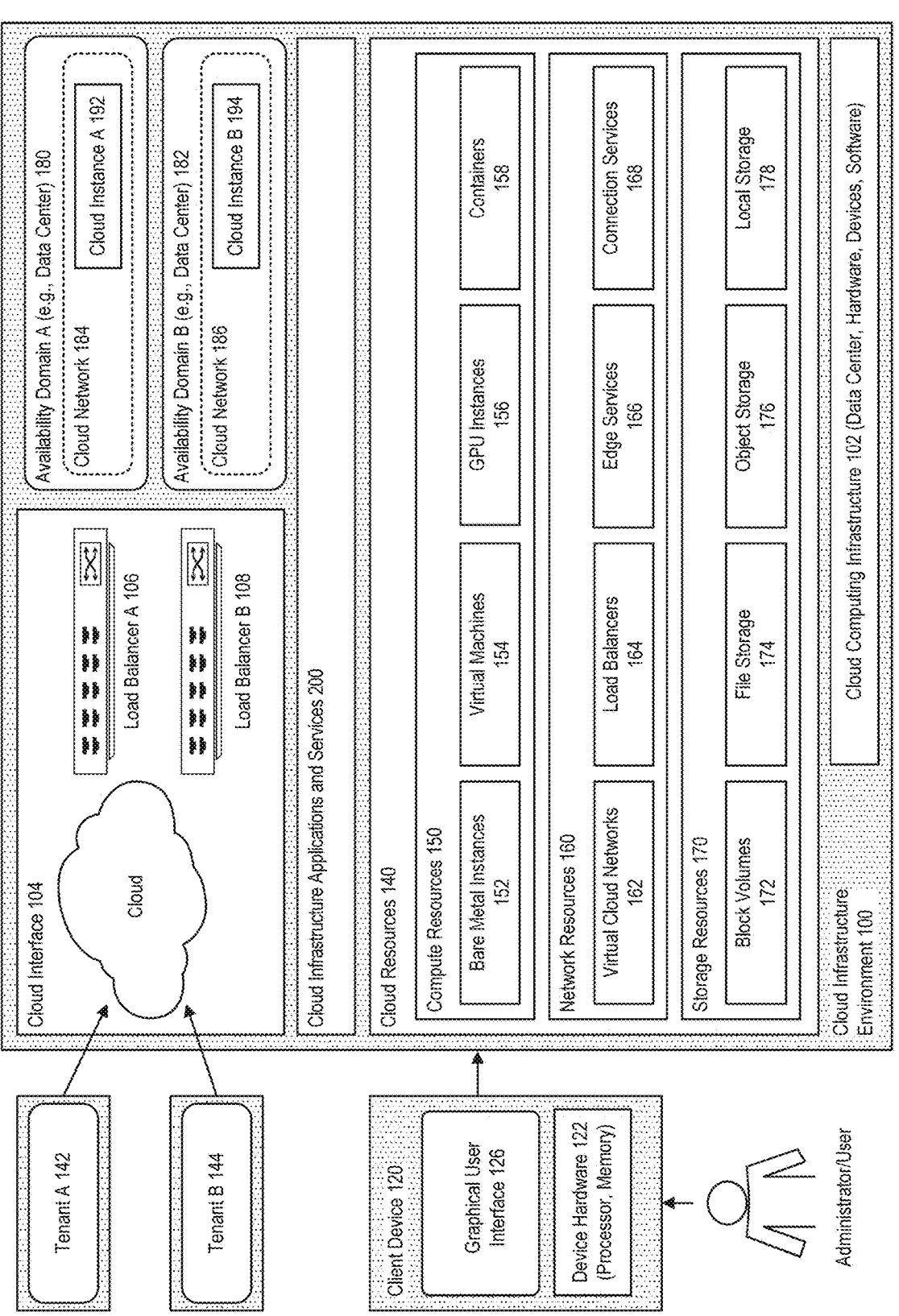
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. CLOUD ENVIRONMENT ACCESS CONTROL ARCHITECTURE
4. ACCESSING CLOUD ENVIRONMENTS THROUGH AN ADMINISTRATIVE TENANCY TO COMPLY WITH SOVEREIGNTY REQUIREMENTS
5. EXAMPLE ADMINISTRATIVE DASHBOARD
6. PRACTICAL APPLICATIONS, ADVANTAGES & IMPROVEMENTS
7. MISCELLANEOUS; EXTENSIONS

1. GENERAL OVERVIEW

One or more embodiments provide user access to cloud environments through an administrative tenancy to comply with sovereignty requirements of the cloud environment (e.g., sovereignty requirements imposed by a country or other entity, which the cloud environment is expected to enforce). The administrative tenancy is one of multiple tenancies in the cloud infrastructure environment. The administrative tenancy includes administrative tools for communicating with services running within the cloud infrastructure environment outside of the administrative tenancy. The user is only able to access these services through the administrative tenancy. User access to the administrative tenancy requires the user to satisfy sovereignty requirements for the cloud environment. After determining that the user satisfies the sovereignty requirements for the cloud environment, the system grants the user access to administrative tools within the administrative tenancy to communicate with the services outside the administrative tenancy.

One or more embodiments control access to cloud resources in the cloud infrastructure environment using a set of access policies. The cloud resources accessible by the user include the administrative tools available to the user and the services running outside of the administrative tenancy. The access policies may have a maximum scope of one of the multiple tenancies; that is, a given access policy may apply to one of the tenancies but not to other tenancies. The set of access policies may specify a static or dynamic group of users who are permitted to access to a static or dynamic group of the cloud resources. In an embodiment, there is no access policy that permits user access directly to the services running outside of the administrative tenancy. User access to the administrative tenancy may be achieved through a virtual private network gateway associated with the administrative tenancy.

One or more embodiments determine that the user satisfies the sovereignty requirement by performing a geographic location check of the user based on the physical location of the user. The geographic location check determines if a source Internet Protocol (IP) address associated with the user belongs to a preconfigured Classless Inter-Domain Routing (CIDR) range corresponding to a preapproved geographic location.

One or more embodiments authenticate the user on an ongoing basis. User authentication may occur as a result of detecting authentication triggers. User authentication may include the user being on a list of approved operators and/or the user not being on a list of forbidden operators. Authenticating a user may also include authenticating a device used by the user. Device authentication may require detecting a hardware security device, e.g., hardware dongle, connected to the device.

One or more embodiments maintain an audit log of users access to the administrative tenancy. The audit log may also include actions taken by the users within the administrative tenancy.

One or more embodiments described in this Specification and/or recited in the claims may not be included in this General Overview section.

2. EXAMPLE CLOUD ENVIRONMENTS

One or more embodiments provide features associated with cloud environments, including dedicated or private label cloud (PLC) environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premise data center, software application framework, or other information technology infrastructure.

Cloud Infrastructure Environments

Figure 2:
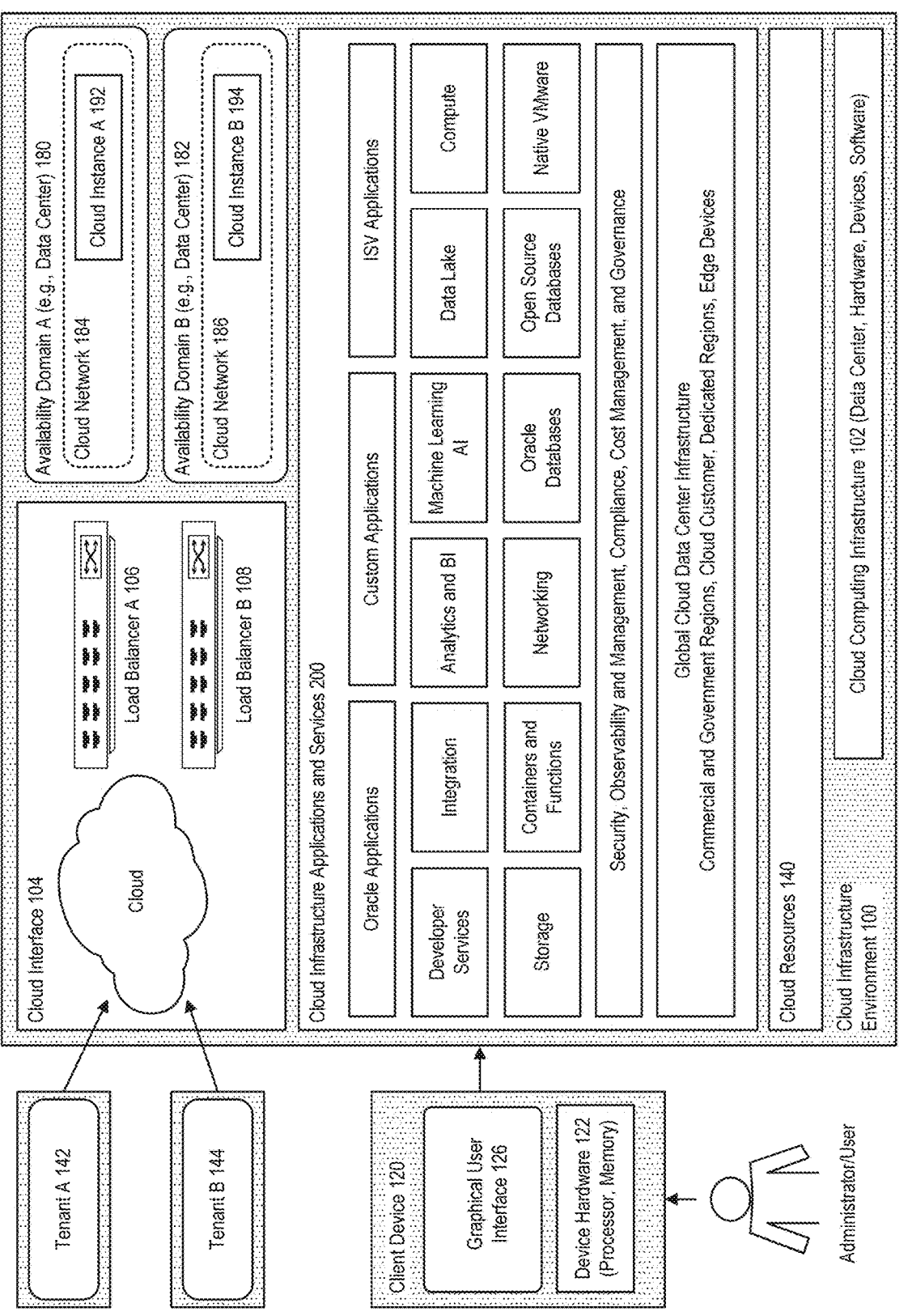
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources.

A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
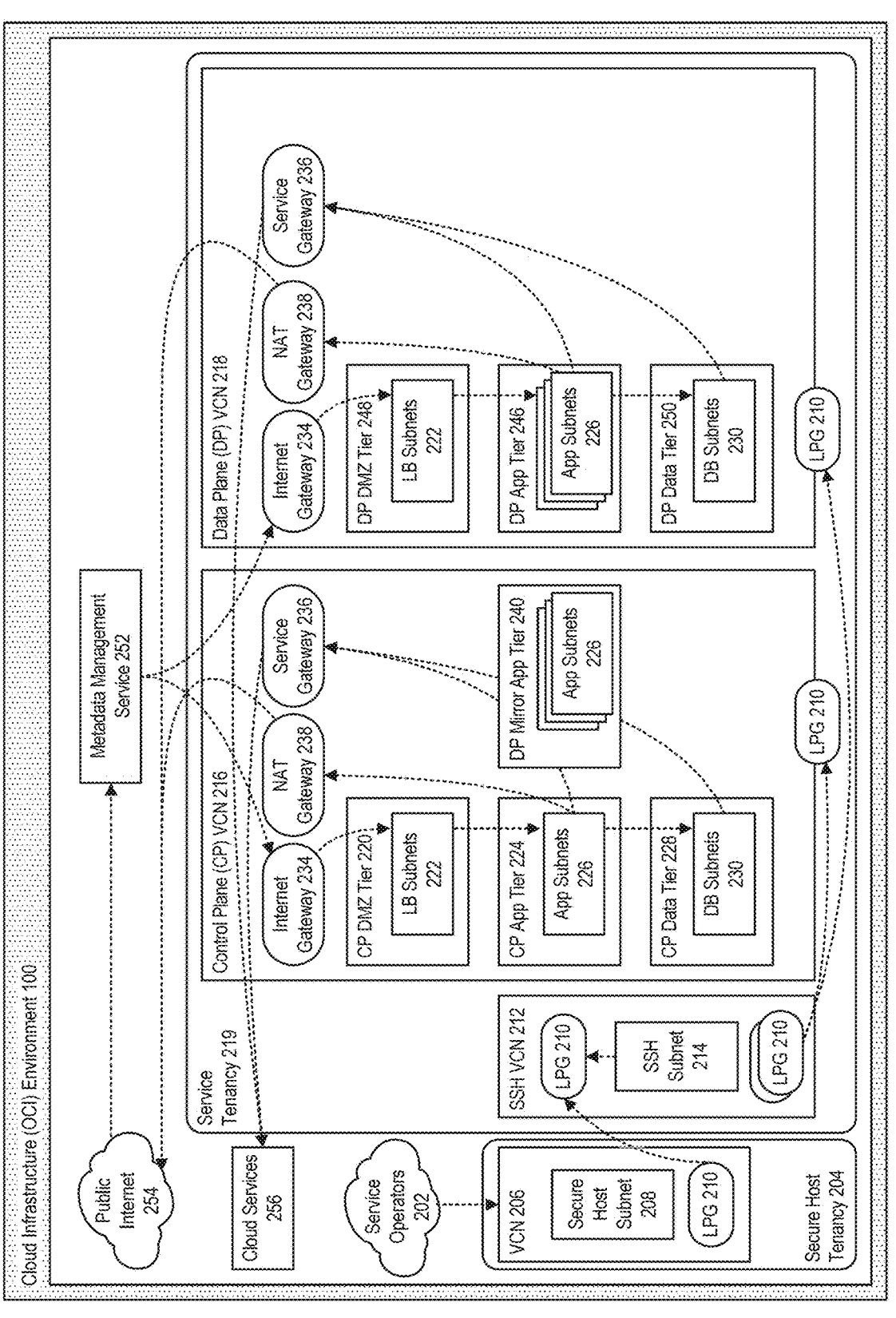
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
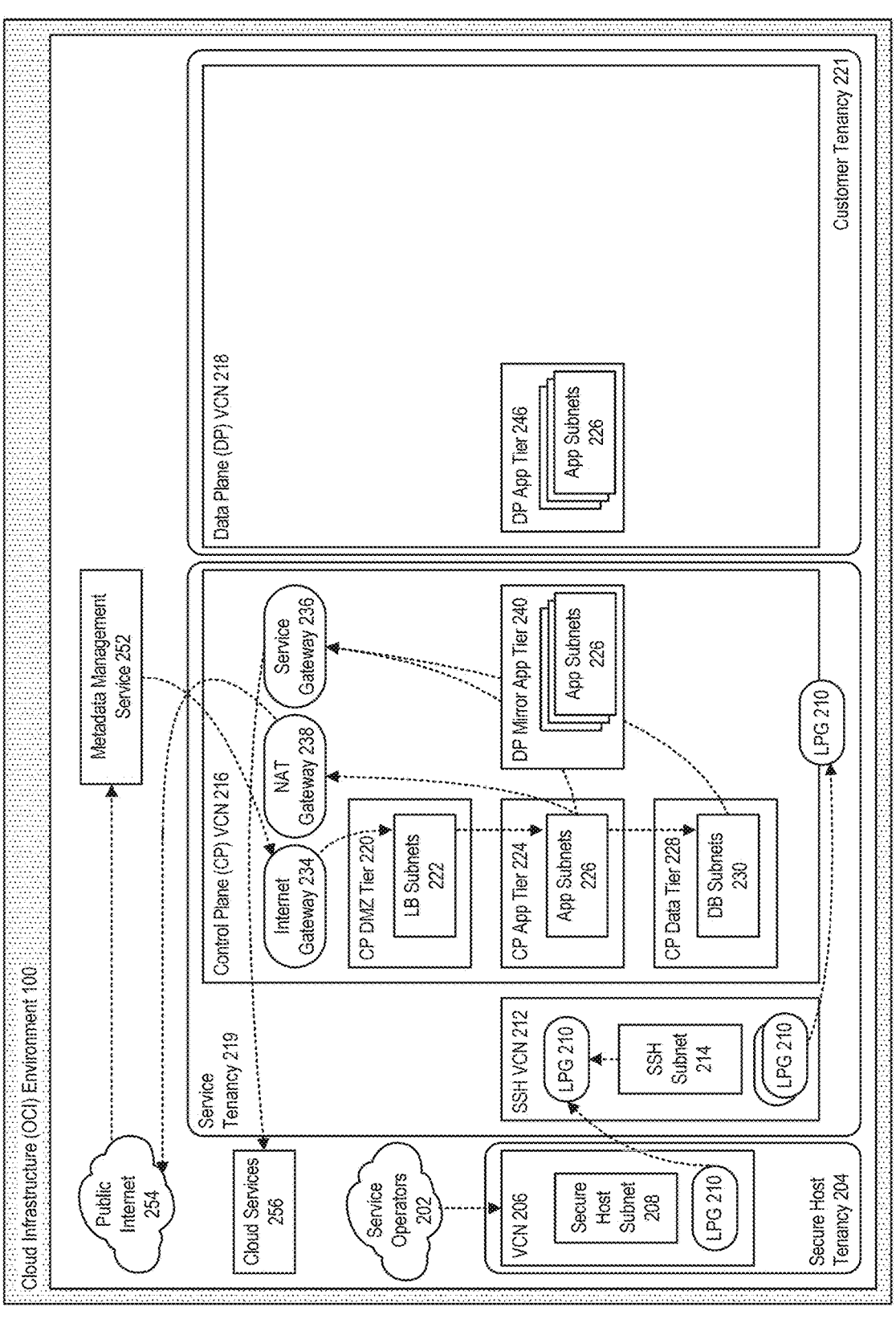
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
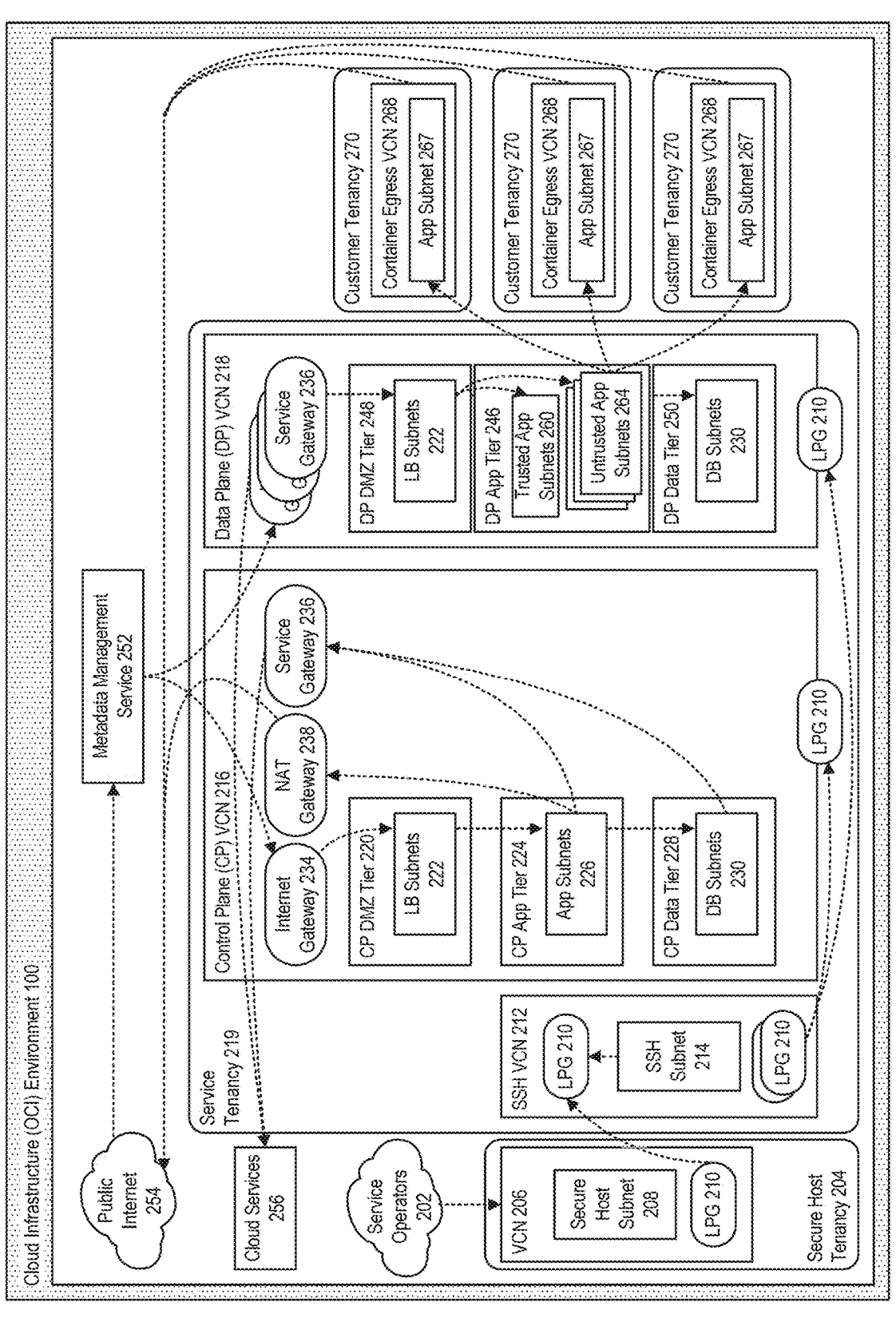
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
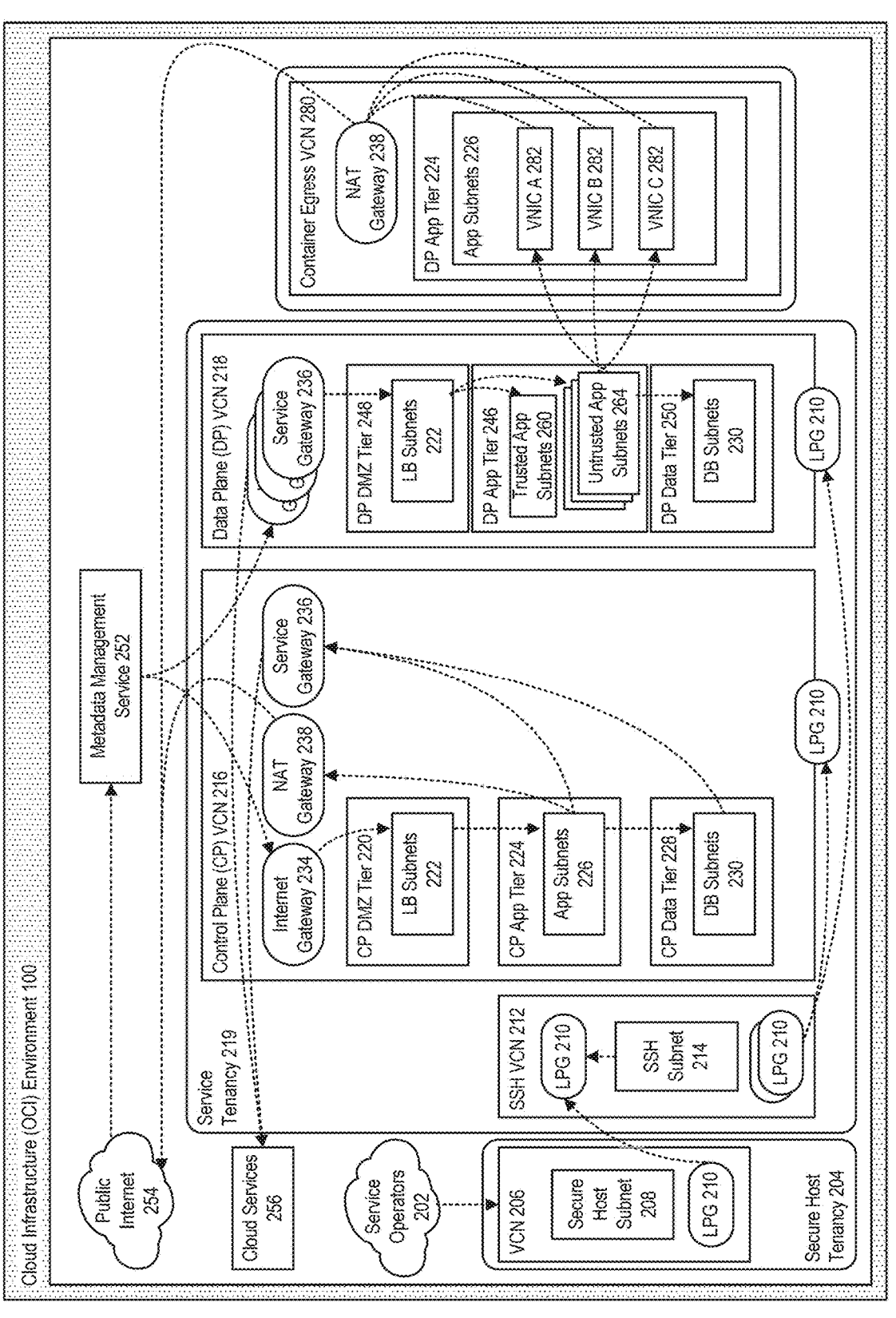
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
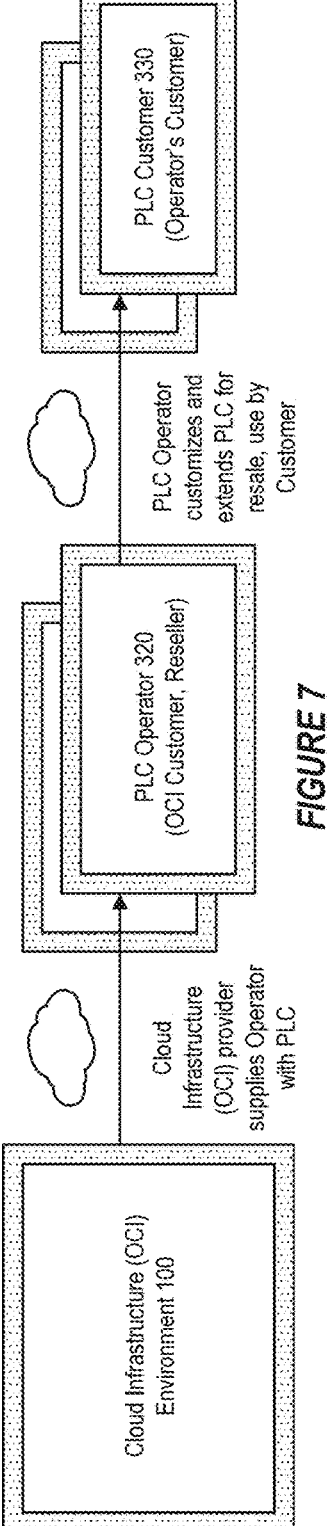
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
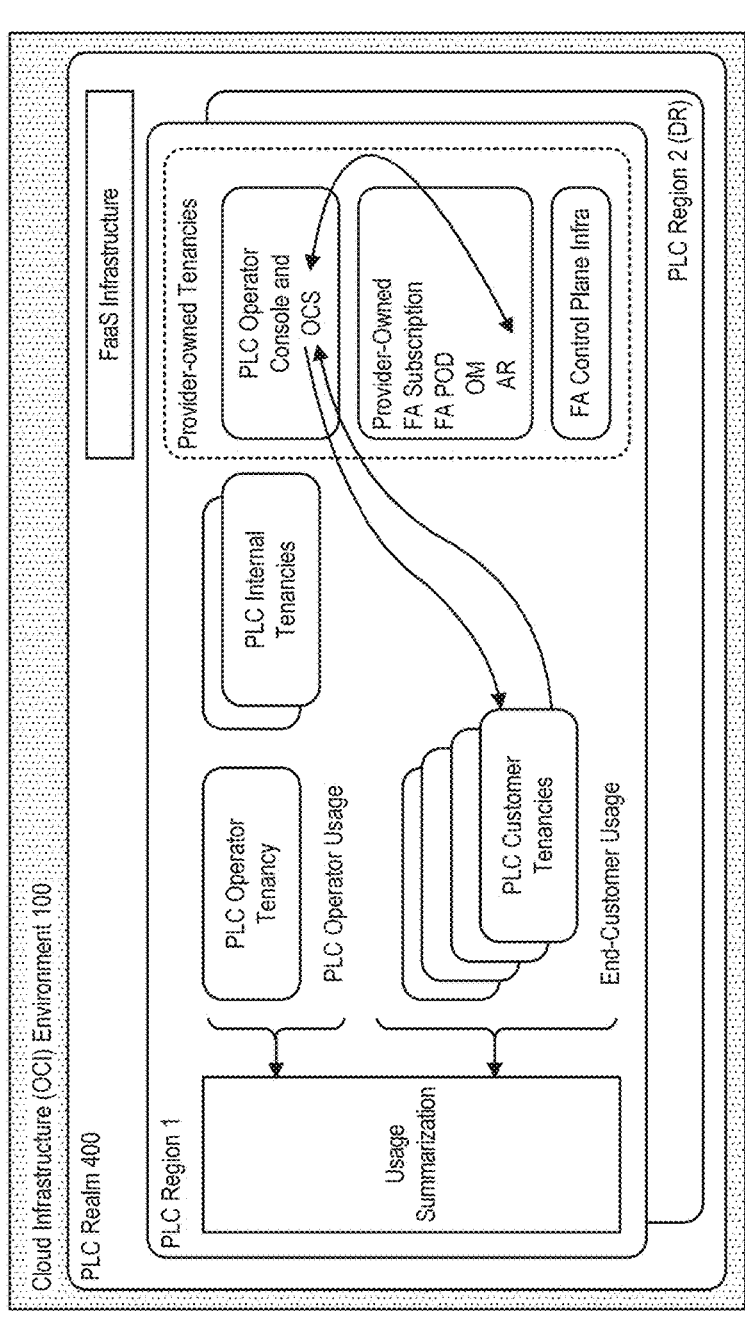
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
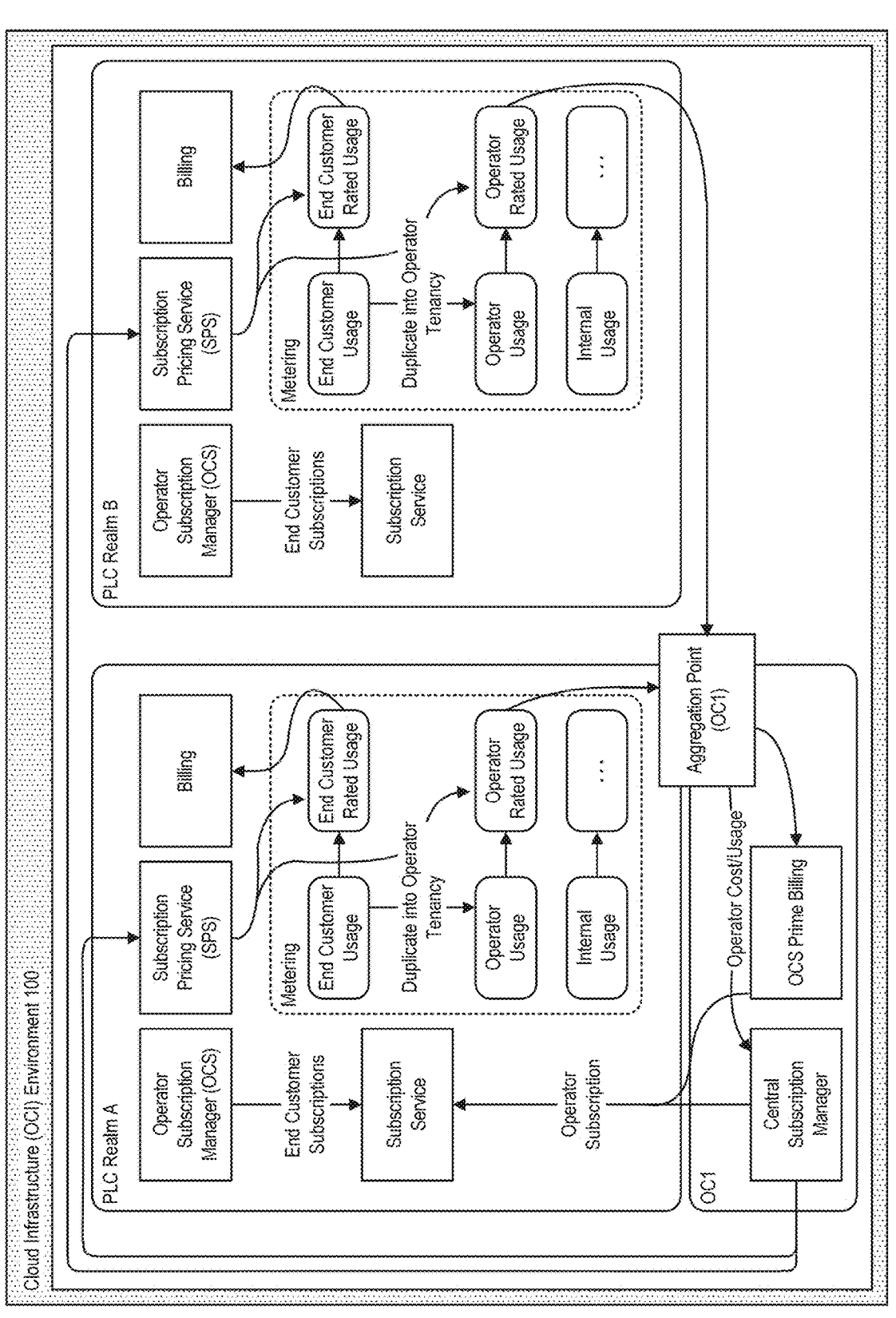
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
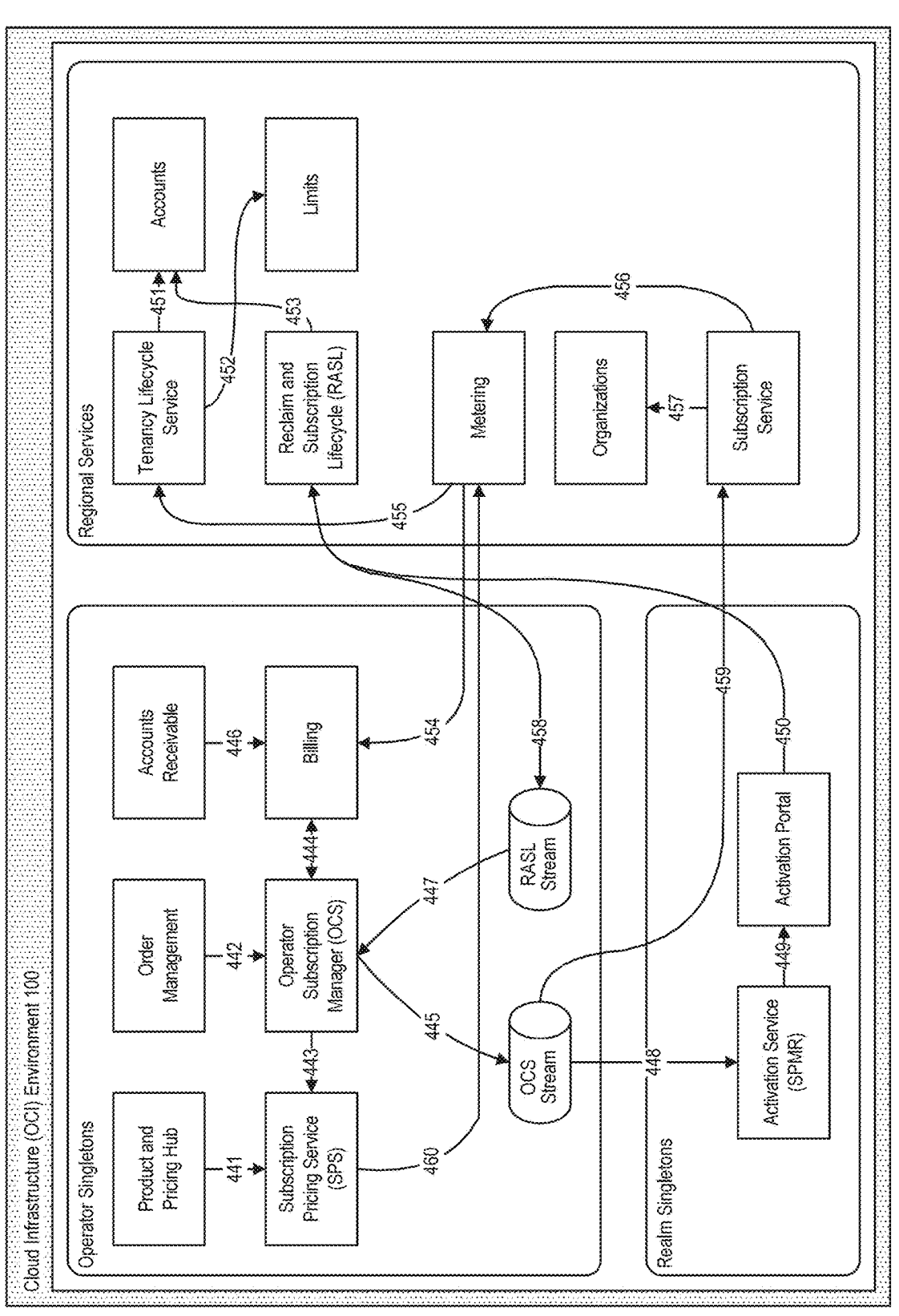
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

2. CLOUD ENVIRONMENT ACCESS CONTROL ARCHITECTURE

FIG. 11A illustrates a system 1100 in accordance with one or more embodiments. As illustrated in FIG. 11A, system 1100 includes a cloud infrastructure environment 1102, a data repository 1104, and an operator device 106. In one or more embodiments, the system 1100 may include more or fewer components than the components illustrated in FIG. 11A. The components illustrated in FIG. 11A may be local to or remote from each other. The components illustrated in FIG. 11A may be implemented in software and/or hardware. Each component may be distributed over multiple applications and/or machines. Multiple components may be combined into one application and/or machine. Operations described with respect to one component may instead be performed by another component.

In one or more embodiments, cloud infrastructure environment 1102 refers to hardware, software, networking, and storage components that enable the delivery of cloud computing services. The cloud infrastructure environment 1102 further includes hardware and/or software configured to perform operations described herein for accessing cloud resources of the cloud infrastructure environment 1102 through an administrative tenancy (e.g., administrative tenancy 1112) to comply with sovereignty requirements. Examples of operations for accessing cloud resources of the cloud infrastructure environment 1102 through an administrative tenancy are described below with reference to FIG. 12.

In one or more embodiments, cloud infrastructure environment 1102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the cloud infrastructure environment 1102 is a cloud computing infrastructure provided by a first entity, e.g., a cloud service provider (CSP), to a second entity, e.g., a customer of the CSP. The customer of the CSP may provide cloud services to a third entity, e.g., an organization or business. The CSP develops and provides the cloud infrastructure technology that powers the cloud infrastructure environment 1102. Customers of the CSP own and deploy the cloud infrastructure environment 1102. Customer operators, i.e., operators associated with customers of the CSP, are responsible for managing at least some aspects of the cloud infrastructure environment 1102. For example, customer operators may be responsible for providing level 1 and level 2 support. Level 1 support may include the initial point of contact for users or customers and provide basic troubleshooting and assistance with common issues. Level 2 support may include handling escalated support tickets, conducting in-depth analysis and troubleshooting of technical issues, performing root cause analysis to identify underlying problems, providing advanced technical guidance and solutions, and/or collaborating with higher levels of support or specialized teams for complex issues that require further expertise. In an embodiment, higher levels of support are provided by CSP operators. The CSP operators maintain and update the core functionalities of the cloud infrastructure environment 1102, ensuring that the cloud infrastructure environment 1102 remains secure and up to date with new features.

In one or more embodiments, the cloud infrastructure environment 1102 is organized into cloud regions. Cloud regions are isolated from each other. A logical collection of one or more cloud regions is referred to as a realm. Realms are accessed separately from one another. Customers of a realm that includes a particular region are unable to traverse realm boundaries to a region outside that realm. Users, i.e., customer operators, CSP operators, and end users, access cloud resources and services through cloud tenancies. A cloud tenancy is a secure and isolated partition of the cloud infrastructure environment 1102 that exists in a single realm. Within this tenancy, users can access services and deploy workloads across all regions within that realm if policies allow.

In one or more embodiments, the cloud regions of the cloud infrastructure environment 1102 include isolated regions. Isolated regions are highly secure and isolated environments within the cloud infrastructure environment 1102 that address the needs of customers with stringent security and compliance requirements. The isolated regions are designed to provide enhanced levels of isolation, control, and regulatory compliance for sensitive workloads and highly regulated industries, such as government, finance, healthcare, and defense. Some examples of isolated regions include, but are not limited to, Oracle Cloud Isolated Regions (OCIR) and Oracle Cloud National Security Regions (NSR).

In one or more embodiments, the cloud infrastructure environment 1102 includes one or more permissions services 1108, one or more infrastructure services 1110, and one or more administrative tenancies 1112.

In one or more embodiments, permissions services 1108 are systems and components responsible for managing access control and permissions for operators, applications, and resources in the cloud infrastructure environment 1102. The permissions services 1108 ensure that authorized users or entities have the appropriate level of access to cloud resources, data, and functionalities. The permission services 1108 may include, for example: identity services, access control lists (ACLs), key management services (KMS), API authorization and authentication, and network security groups (NSGs). The identity services may be part of a collection of services including IAM and access control engine.

In one or more embodiments, identity services manage user identities, access rights, and permissions for accessing cloud services and resources. Identity services include various features, such as user authentication, authorization, user provisioning and deprovisioning, role-based access control, multi-factor authentication (MFA), and centralized policy management. Identity services allow organizations to define and enforce fine-grained access controls based on roles, groups, or individual operators, ensuring that accessing specific resources or performing certain actions is restricted to authorized operators.

In one or more embodiments, identity services provide Just-In-Time (JIT) credentials. JIT credentials are access credentials, such as usernames and passwords, API keys, or temporary tokens, that are generated dynamically and provided to users or systems on-demand, immediately before the credentials are needed. JIT credentials may be short-lived and are valid for a limited period or for a specific use case. JIT credentials provide for on-demand generation, short-lived validity, scoped access, dynamic revocation, auditing, and logging. When an operator requests access to a resource or service, the identity services dynamically generates a set of credentials specifically for that request based on existing permissions. These credentials are generated just-in-time and are not stored or predefined in advance. JIT credentials are designed to be temporary and have a limited lifespan. JIT credentials may be valid for a short period, such as a few minutes or hours, to minimize the risk of exposure and unauthorized use. JIT credentials may be scoped to a specific resource, service, or operation. JIT credentials may provide access to the resources or actions required to fulfill the immediate request and do not grant broader permissions beyond what is necessary. After the allotted time period or use case has expired, JIT credentials are automatically revoked or invalidated by the identity services. JIT credential generation and usage may be logged and audited by the permissions service 1108 to provide visibility into who accessed what resources and when.

In one or more embodiments, ACLs are used to define and enforce access control policies at the resource level, such as storage buckets, virtual machines, or databases. ACLs specify the users or entities that are granted access to a particular resource and what actions the users or entities are allowed to perform (e.g., read, write, execute). KMS services manage cryptographic keys used for encrypting and decrypting data in cloud environments. KMS services control access to encryption keys through access policies, allowing organizations to define who can manage and use encryption keys for protecting sensitive data.

In one or more embodiments, APIs provide programmatic access to resources and functionalities. API authorization and authentication services manage access to these APIs, ensuring that interacting with cloud resources via APIs is restricted to authorized applications or services. API authorization and authentication services may use standards such as OAuth 2.0 or JSON Web Tokens to secure API access. NSGs are used to define and enforce network-level access controls within the cloud infrastructure environment 1102. NSGs specify rules that control inbound and outbound traffic to and from cloud resources based on source and destination Internet Protocol (IP) addresses, ports, and protocols.

In one or more embodiments, the infrastructure services 1110 for the cloud infrastructure environment 1102 encompass resources that enable delivery, management, and operation of cloud-based solutions. Infrastructure services 1110 encompass a wide range of services, including (a) compute services, e.g., virtual machines and/or containers, (b) storage services, e.g., object storage and/or block storage, (c) networking services, e.g., virtual networks and/or load balancing, (d) database services, e.g., relational databases and/or NoSQL Databases, (c) identity and access management, e.g., authentication and/or authorization, (f) monitoring and logging, e.g., metrics monitoring, logging, and/or auditing, and/or (g) security services, e.g., firewalls and/or encryption.

In one or more embodiments, the infrastructure services 1110 include various subcomponents not shown in FIG. 11A. For example, the infrastructure services 1110 may include an abuse service, a fraud service, a security service, and/or a compliance service. An abuse service or abuse management service addresses and mitigates various forms of abuse or misuse of cloud resources and services. The abuses may include various activities, such as spamming, phishing, malware distribution, denial-of-service (DOS) attacks, unauthorized access, or any behavior that violates the CSP's terms of service or acceptable use policies. A fraud service or fraud detection service detects, prevents, and mitigates fraudulent activities occurring within the cloud infrastructure or involving cloud-based services. The fraudulent activities may include unauthorized access, data breaches, identity theft, financial fraud, and other forms of malicious behavior aimed at exploiting cloud resources or compromising cloud-based systems. Security services protect cloud-based resources, applications, and data from various security threats and vulnerabilities. The security service may mitigate risks, enforce security policies, and maintain compliance with regulatory requirements. A compliance service ensures adherence to regulatory requirements, industry standards, and internal policies related to data protection, privacy, security, and governance.

In one or more embodiments, an administrative tenancy 1112 is a CSP-owned tenancy within the cloud infrastructure environment 1102 allocated for administrative purposes. In this context, a tenancy is "owned" by the entity that is primarily responsible for the tenancy. For example, CSP-owned tenancies are generally not accessible to customers of the CSP. A customer-owned tenancy, while still under CSP's control to some extent, includes resources that are specifically for that customer's use. For example, a customer-owned tenancy may include customer-specific applications and/or services. A third-party-owned tenancy is a tenancy that is "owned" by neither the CSP or the customer of the CSP, but rather by a third party. For example, the third party may be a customer of the CSP's customer, in a PLC configuration as described in further detail herein.

In an embodiment, the administrative tenancy 1112 is distinct from regular tenant spaces used for hosting applications, services, or data and is specifically designated for administrative tasks, management activities, and governance functions. Access to the administrative tenancy 1112 is restricted to authorized users, i.e., operators or information technology (IT) staff responsible for managing and governing the cloud environment. The administrative tenancy 1112 is equipped with specialized management tools, consoles, and interfaces that provide administrators with visibility, control, and automation capabilities for managing cloud resources and services outside the administrative tenancy. The administrative tenancy 1112 may support governance functions such as IAM, security configuration, compliance monitoring, and policy enforcement. The administrative tenancy 1112 is isolated from regular tenant spaces to minimize the risk of unauthorized access, data leakage, or disruption to production environments.

In one or more embodiments, operators use the administrative tenancy 1112 to manage and configure underlying infrastructure components such as virtual networks, storage, compute resources, and database services. The administrative tenancy 1112 hosts monitoring and reporting tools that enable administrators to track resource usage, performance metrics, security events, and compliance status, thereby facilitating proactive management and decision-making. Operators may use the administrative tenancy to implement change management processes, deploy updates, patches, and configuration changes in a controlled and auditable manner to minimize disruption and ensure stability.

In one or more embodiments, by segregating administrative functions from regular tenant spaces, the use of the administrative tenancy 1112 mitigates security risks and reduces the attack surface, enhancing overall security posture. The administrative tenancy 1112 supports compliance efforts by providing tools and controls for enforcing regulatory requirements, monitoring adherence to policies, and generating audit trails. Supplying administrative tools in an administrative tenancy 1112, as opposed to on a local operator device, ensures that operators have access to the same, most up-to-date resources. Streamlined management tools and automation capabilities within the administrative tenancy 1112 improve operational efficiency, enabling administrators to perform tasks more quickly and consistently. Isolating administrative functions in a dedicated tenancy helps mitigate the risk of accidental misconfigurations, unauthorized access, and operational errors that could impact production environments.

In one or more embodiments, the administrative tenancy 1112 includes a virtual private network (VPN) server 1114, administrative tools 1116, and an audit service 1118.

In one or more embodiments, the VPN server 1114 is a specialized server that enables users to create a secure and encrypted connection to the administrative tenancy 1112 over the internet. VPN servers 1114 enable remote users to securely access resources and services hosted in the administrative tenancy from many different locations, using internet-connected devices. The VPN server 1114 facilitates secure communication and data transfer between users (e.g., CSP operators) and the administrative tenancy 1112, allowing users to access resources, services, and data within the administrative tenancy 1112 as if the users were directly connected to the administrative tenancy.

In one or more embodiments, the VPN server 1114 enforces access control policies to restrict or allow access to specific resources, services, or network segments within the cloud infrastructure environment 1102 based on user credentials, group memberships, or other attributes. When a user initiates a connection to the VPN server 1114, the data transmitted between the user's device and the VPN server 1114 is encrypted using secure encryption protocols, such as SSL/TLS or IPsec. This encryption ensures that data remains confidential and secure during transmission over the internet. The encrypted data is encapsulated within a secure tunnel, which protects the encrypted data from interception or tampering by unauthorized parties. Tunneling creates a virtual point-to-point connection between the user's device and the VPN server 1114.

In one or more embodiments, prior to establishing a connection with the administrative tenancy 1112, users are required to authenticate themselves to the VPN server 1114 using credentials, such as a username and password, digital certificates, or other authentication methods. This authentication process verifies the user's identity and authorizes access to the VPN server 1114. Once authenticated, the VPN server 1114 routes the user's internet traffic through the encrypted tunnel to the administrative tenancy 1112. The VPN server 1114 provides a high level of security by encrypting data transmitted over the internet and establishing secure connections between users and the administrative.

In one or more embodiments, the VPN server 1114 includes an authentication service 1120 and a sovereignty verification service 1122. Although illustrated as part of the VPN server 1114, the authentication service 1120 and/or the sovereignty verification service 1122 may be independent services hosted in the administrative tenancy 1112 or elsewhere in the cloud infrastructure environment 1102. Alternatively, the authentication service 1120 and/or the sovereignty verification service 1122 may be components of the permissions service 1108 accessible by the VPN server 1114.

In one or more embodiments, the authentication service 1120 is a system or platform that authenticates and authorizes users and devices attempting to access resources, services, or data within the cloud infrastructure environment 1102 through the administrative tenancy 1112. The authentication service 1120 ensures the security, integrity, and confidentiality of information by verifying the identities of users and devices before granting access to the administrative tenancy 1112. The authentication service 1120 verifies the identity of users and devices attempting to access the administrative tenancy 1112 using various authentication methods, e.g., passwords, biometrics, smart cards, tokens, or digital certificates.

In one or more embodiments, the authentication service 1120 supports MFA to enhance security by requiring users to provide multiple forms of verification. The authentication service 1120 may include device recognition capabilities to authenticate and authorize devices based on unique identifiers, such as media access control (MAC) addresses, IP addresses, device certificates, or hardware tokens. The authentication service 1120 provides centralized management and administration of user accounts, credentials, and access policies, enabling administrators to enforce security controls and manage access permissions effectively. The authentication service 1120 may integrate with identity providers, directory services, or single sign-on (SSO) solutions to streamline user authentication processes and leverage existing identity management infrastructure.

In one or more embodiments, the authentication service 1120 controls access to resources, services, and data within the administrative tenancy 1112 by verifying the identities of users and devices and enforcing access policies based on predefined permissions and privileges. The authentication service 1120 may support identity federation and single sign-on (SSO) to enable seamless authentication and access across multiple applications, services, or domains using a single set of credentials. The authentication service 1120 may assist organizations in complying with regulatory requirements, industry standards, and internal security policies by enforcing authentication controls, logging authentication events, and generating audit trails for compliance reporting. The authentication service 1120 may implement standard authentication protocols such as OAuth, OpenID Connect, SAML, LDAP, or RADIUS to enable interoperability and integration with existing identity management systems and applications. The authentication service 1120 may deploy identity providers or directory services, e.g., Active Directory, LDAP, or Azure AD, to manage user accounts, credentials, and access policies centrally and provide authentication services to connected applications and services.

In one or more embodiments, the authentication service 1120 enables MFA mechanisms, e.g., SMS codes, push notifications, biometrics, or hardware tokens, to enhance security and protect against account compromise. The authentication service 1120 may implement device management solutions to register, authenticate, and manage devices accessing the network or system, enforcing security controls and compliance requirements based on device characteristics and configurations. The authentication service 1120 may configure security controls such as password policies, session management, access restrictions, and account lockout mechanisms to enforce security best practices and prevent unauthorized access or misuse of credentials.

In one or more embodiments, a sovereignty verification service 1122 is a system or process designed to authenticate and validate a user's compliance with specific sovereignty-related criteria or regulations. The sovereignty verification service 1122 verifies the identity of the user, ensuring that the user is who the user claims to be. This may involve authentication mechanisms such as username/password, biometric authentication, or MFA. In addition to identity verification, the sovereignty verification service 1122 verifies specific attributes or qualifications required to meet sovereignty requirements. These attributes could include citizenship status, residency status, organizational affiliation, or other relevant criteria. The sovereignty verification service 1122 conducts checks to ensure that the user meets specific sovereignty requirements mandated by regulatory authorities, government agencies, or industry standards. This may involve verifying that the user's location, jurisdiction, or organizational affiliations align with the required criteria. The sovereignty verification service 1122 validates the accuracy and integrity of data provided by the user, ensuring that the information used for verification purposes is reliable and up-to-date. Validation may involve cross-referencing user-provided data with external databases or authoritative sources.

In one or more embodiments, the sovereignty verification service 1122 ensures compliance with sovereignty-related regulations, laws, and/or policies governing access to resources, services, and/or data within a specific jurisdiction or geographic location. By verifying that users meet sovereignty requirements, the sovereignty verification service 1122 enables organizations to enforce access controls and restrictions based on legal, regulatory, or contractual obligations related to data sovereignty and jurisdictional compliance. Verification of sovereignty requirements permits users to provide virtual support services to the cloud infrastructure environment 1102. By validating user compliance with sovereignty requirements, the service helps mitigate risks associated with unauthorized access, data breaches, or non-compliance with legal and regulatory obligations. The sovereignty verification service 1122 enhances trust and assurance in user interactions by providing verification mechanisms that validate users' adherence to sovereignty-related criteria and requirements.

In one or more embodiments, the sovereignty verification service 1122 includes processes that ensure that a user is not using a VPN service or Tor (The Onion Router) server, or other mechanism designed to mask their physical location. These processes may include checking the source IP address against a list of known VPN services and/or Tor services. The sovereignty verification service 1122 detects when a user is attempting to use VPN or Tor to mask their physical location. The sovereignty verification service 1122 may use one or more of Deep Packet Inspection (DPI) solutions, endpoint security solutions, and threat intelligence feeds to detect a request for access from a user through a VPN or Tor service. DPI solutions inspect the contents of network packets to identify patterns indicative of VPN or Tor traffic, such as characteristic packet header fields or encryption signatures. DPI tools can analyze packet payloads for known VPN or Tor protocols, allowing organizations to detect and block access to the administrative tenancy 1112. Endpoint security solutions can detect the presence of VPN or Tor software installed on devices used by a user to attempt access to the administrative tenancy 1112. Endpoint detection and response platforms monitor device activity and identify attempts to establish connections through VPN or Tor services. Threat intelligence feeds identify known VPN or Tor exit nodes and IP addresses. The threat intelligence feeds are available for subscription and permit identifying and blocking of access requests originating from these sources. The threat intelligence platforms provide real-time updates on emerging threats and indicators of compromise associated with VPN or Tor usage.

In one or more embodiments, the sovereignty verification service 1122 uses one or more of Domain Name System (DNS) filtering, proxy detection services, and/or behavioral analysis to detect a request for access from a user through a VPN or Tor service. DNS filtering services block access from known VPN or TOR-related domains and IP addresses, preventing users from masking their physical location. DNS filtering solutions maintain updated lists of blacklisted domains and IP addresses associated with VPN or Tor providers. Proxy detection services offer APIs or libraries that analyze incoming requests to determine whether the requests originate from VPN or Tor exit nodes. These services identify and block traffic from proxy servers. Behavioral analysis techniques monitor user behavior and device activity to detect deviations from normal usage patterns. Unusual patterns of network activity can indicate potential VPN or Tor usage.

In one or more embodiments, administrative tools 1116 refer to hardware and/or software for managing, monitoring, and configuring various cloud resources. Administrative tools 1116 facilitate interactions between users within the administrative tenancy 1112 and the infrastructure services 1110 deployed within the cloud infrastructure environment 1102 outside the administrative tenancy 1112.

In one or more embodiments, the administrative tools 1116 include dashboards or consoles for managing and interacting with services outside of the administrative tenancy 1112. The dashboards may provide features for provisioning resources, configuration management, monitoring and logging, and security and compliance. Resource provisioning includes deploying, scaling, and managing cloud resources such as virtual machines, storage, databases, and networking components. Configuration management includes configuring settings, parameters, and access controls for cloud services and resources. Monitoring and logging includes monitoring resource usage, performance metrics, and log data to identify issues, optimize performance, and troubleshoot problems. Security and compliance include managing security settings, encryption keys, and compliance controls to ensure data protection and regulatory compliance.

In one or more embodiments, the administrative tools 1116 include command-line interfaces (CLIs) for interacting with services outside of the administrative tenancy. CLIs allow user to interact with services using text-based commands. The CLIs provide similar functionality to dashboards and offer additional flexibility and automation capabilities. The CLIs permit automating tasks and workflows by scripting CLI commands using shell scripts, PowerShell, or other scripting languages. The CLIs permit performance of bulk operations, resource provisioning, or configuration changes using CLI commands in batch mode. CLIs integrate commands with DevOps tools and workflows for continuous integration, deployment, and automation.

In one or more embodiments, the administrative tools 1116 include APIs. CSPs expose APIs that allow users to programmatically interact with services outside the administrative tenancy 1112. APIs provide a standardized interface for integrating cloud services with custom applications, tools, and scripts. APIs may be used to manage resources, automate actions, and integrate with third-party tools. Resource management includes creating, updating, and deleting cloud resources programmatically using RESTful API endpoints. Event-driven automation includes triggering actions, notifications, or workflows in response to events generated by cloud services using webhook APIs. Integration with third-party tools includes integrating cloud services with third-party management tools, monitoring platforms, and orchestration frameworks using API integrations.

In one or more embodiments, the audit service 1118 is a system or platform that monitors, records, and analyzes activities and events within the administrative tenancy of the cloud infrastructure environment 1102. The audit service 1118 provides visibility, transparency, and accountability by generating comprehensive audit logs and reports of user actions, system events, and resource activities. The audit service 1118 continuously monitors and logs various types of activities and events occurring within the cloud environment, including user access, resource utilization, configuration changes, security incidents, and compliance-related activities. The audit service 1118 maintains detailed audit trails containing records of all relevant events, including timestamps, user identities, actions performed, and any associated metadata or contextual information. The audit service 1118 provides capabilities for both real-time monitoring and historical analysis of audit data, allowing administrators to detect anomalies, investigate incidents, and analyze trends over time. Administrators may configure customizable audit policies and alerts to define specific criteria or thresholds for monitoring and triggering notifications or alerts based on predefined conditions. The audit service 1118 may integrate with industry-standard compliance frameworks and regulations, such as GDPR, Health Insurance Portability and Accountability Act (HIPAA), PCI DSS, or SOC 2, to facilitate compliance monitoring, reporting, and auditing.

In one or more embodiments, the audit service 1118 allows organizations to monitor and detect security incidents, unauthorized access attempts, and suspicious activities within the cloud infrastructure environment 1102, enabling timely response and mitigation of security threats. The audit service assists organizations in maintaining compliance with regulatory requirements, industry standards, and internal policies by providing audit trails and reports that demonstrate adherence to relevant security and data protection standards. In the event of security breaches or incidents, the audit service facilitates forensic analysis and investigation by providing detailed audit logs and historical data for reconstructing events, identifying root causes, and attributing accountability.

In one or more embodiments, a data repository 1104 is any type of storage unit and/or device (e.g., a file system, database, collection of tables, or any other storage mechanism) for storing data. Further, a data repository 1104 may include multiple different storage units and/or devices. The multiple different storage units and/or devices may or may not be of the same type or located at the same physical site. Further, a data repository 104 may be implemented or executed on the same computing system as the cloud infrastructure environment 1102 and/or the operator device 1106. Additionally, or alternatively, a data repository 104 may be implemented or executed on a computing system separate from the cloud infrastructure environment 1102 and/or the operator device 1106. The data repository 104 may be communicatively coupled to the cloud infrastructure environment 1102 and/or the operator device 1106 via a direct connection or via a network.

Information describing the cloud infrastructure environment 1102 may be implemented across any of components within the system 1100. However, this information is illustrated within the data repository 1104 for purposes of clarity and explanation.

In one or more embodiments, the data repository 1104 includes access policies 1124, a permissions database 1126, audit logs 1128, an approved operators list 1132, an approved device list 1134, and sovereignty requirements 1136.

In one or more embodiments, access policies 1124 define the rules and permissions that govern who can access what resources and what actions they are allowed to perform within the cloud infrastructure environment 1102. Access policies 1124 are essential for enforcing security, compliance, and governance requirements. Access policies 1124 may specify the users, groups, roles, or service accounts that are granted access to specific cloud resources. Access policies define the permissions granted to users or entities for interacting with specific cloud resources. Access policies 1124 allow for granular control over permissions, enabling organizations to specify fine-grained access based on individual resources, attributes, or conditions. Access policies 1124 may include conditions that are required to be met for access to be granted, such as requiring MFA, originating from specific network locations, or using specific client devices.

In one or more embodiments, the permissions database 1126 is a centralized repository for permissions, access controls, and authorization settings for various resources within the cloud infrastructure environment 1102. The permissions database 1126 may be utilized by the permissions service 1108, the authentication service 1120, and/or the sovereignty verification service 1122, to enforce security policies, manage user access, and ensure compliance with regulatory requirements. The permissions database 1126 may store information about users, groups, roles, and their associated permissions for accessing specific resources or performing certain actions. Permissions information may include various details, such as user identities, resource identifiers, permissions granted (e.g., read, write, delete), and any conditions or restrictions associated with the permissions. The permissions database 1126 provides a centralized location for managing access controls and authorization policies across the cloud infrastructure environment 1102. The permissions database 1126 may include audit logs and records of access activities for tracking changes to permissions, monitoring user access, and demonstrating compliance with regulatory requirements.

In one or more embodiments, audit logs 1128 are chronological records of events, actions, or transactions that occur within the administrative tenancy 1112. Audit logs 1128 capture important information about user activities, system events, and changes made to configurations or data. Audit logs serve several purposes, including security monitoring, compliance, troubleshooting, and forensic analysis. Audit logs are organized in chronological order, recording events as they occur over time. This chronological sequence helps establish timelines and correlations between different activities. Audit logs provide detailed information about each logged event, including the date and time, the user or entity responsible, the type of event, and any relevant parameters or details. Audit logs capture a wide range of activities, including user logins, file accesses, system configuration changes, network traffic, and security incidents. This visibility enables administrators to monitor and track various aspects of system behavior.

In one or more embodiments, audit logs 1128 are retained for a specified period, as mandated by regulatory requirements, organizational policies, or security best practices. Retaining logs allows for historical analysis, forensic investigations, and compliance auditing. Audit logs permit monitoring and detecting security incidents, unauthorized access attempts, and suspicious activities. Security teams can analyze audit logs to identify anomalies and potential security threats. Audit logs 1128 all organizations to demonstrate compliance with regulatory requirements, industry standards, and internal policies. Organizations may be required to retain and review audit logs to prove adherence to specific security and data protection standards. Audit logs provide valuable information for troubleshooting system issues, diagnosing errors, and investigating security incidents. By reviewing audit logs, administrators can identify the root cause of problems and take appropriate remedial actions. Audit logs 1128 are useful for forensic investigations following security breaches, data breaches, or other incidents. Forensic analysts can analyze audit logs to reconstruct events, trace the activities of attackers, and gather evidence for legal proceedings. Audit logs 1128 promote user accountability by recording user activities and actions performed within a system. User awareness of their actions are being logged may be a deterrent for malicious behavior and enforce accountability.

In one or more embodiments, audit logs 1128 include records of user login attempts, successful logins, failed login attempts, and user logout events. Audit logs 1128 include instances of file creation, modification, deletion, and access events, including the user or process accessing the file. Audit logs 1128 may include records of changes to system configurations, settings, permissions, and policies made by administrators or automated processes. Audit logs capture network traffic, including incoming and outgoing connections, protocol usage, and data transfers. Audit logs 1128 include logs security-related events such as intrusion detection alerts, firewall rule violations, malware detections, and system breaches.

In one or more embodiments, authentication triggers 1130 are events or conditions that prompt the system to re-authenticate the user during their session to ensure continuous or ongoing security and authorization. Authentication triggers 1130 help maintain the integrity of access controls and protect sensitive resources from unauthorized access. Authentication triggers 1130 may include session timeout, time-based re-authentication, activity-based re-authentication, privilege elevation, MFA reset. When a user's session remains idle for a specified period, the system may triggers re-authentication when the user attempts to resume their session after the timeout. The system may prompt users to re-authenticate periodically, regardless of activity, based on predefined time intervals (e.g., every hour or every day) to minimize the risk of unauthorized access. Re-authentication may be triggered based on user activity or specific actions performed within the administrative tenancy, such as accessing sensitive resources, performing high-risk operations, or changing critical settings. When a user attempts to elevate their privileges or access resources that require higher authorization levels within the administrative tenancy, the system may trigger re-authentication to verify the user's identity and authorization. Users may be prompted to re-authenticate with additional factors (e.g., OTP, biometric verification) if there are changes in the MFA settings or if a specific event requires re-verification of identity.

In one or more embodiments, authentication triggers 1130 include location-based authentication, device change, policy enforcement, external events or alerts, and/or authentication token expiry. Re-authentication may be triggered if the user's geographical location changes significantly during the session, indicating a potential security risk or unauthorized access attempt. When the user switches to a different device or platform during the session, the system may trigger re-authentication to ensure that the user's identity is verified on the new device. Re-authentication may be initiated in response to external events, alerts, or anomalies detected by security monitoring systems, indicating potential security threats or suspicious activities. If the authentication token or session identifier used by the user expires or becomes invalid due to security policies, the system may prompt re-authentication to issue a new token and verify the user's identity.

In one or more embodiments, the approved operators list 1132 is a controlled list of individuals who are authorized to access and manage the administrative resources within the cloud infrastructure. Operators may have different levels of privileges and responsibilities for administering, configuring, and securing the cloud environment. The approved operator list specifies the individuals or roles authorized to access the administrative tenancy 1112, ensuring that only designated personnel have privileged access to critical resources and management tools. Access to the administrative tenancy may be governed by role-based access control (RBAC) policies, which assign specific roles, permissions, and privileges to authorized users based on their roles and level of authority. Operators included in the approved list are granted the minimum level of access necessary to perform their assigned duties, following the principle of least privilege to minimize the risk of unauthorized actions or data exposure. The approved operator list may be continuously or periodically reviewed and updated to reflect changes in personnel, roles, or access requirements. Access privileges may be revoked or modified as necessary. The approved user list may be integrated with identity management systems, directory services, or single sign-on (SSO) solutions to streamline user provisioning, authentication, and access control processes.

In one or more embodiments, the approved device list 1134 includes a controlled inventory of devices from which authorized users are able to access and manage administrative resources within the cloud infrastructure environment 1102. These devices may belong to authorized personnel responsible for administering, configuring, and securing the cloud environment. Devices included in the approved list are authenticated using secure mechanisms such as device certificates, MAC address filtering, or device enrollment processes to verify their identities and ensure they meet security standards. The approved device list is managed and maintained by the organization's IT or security team, who oversee the registration, configuration, and monitoring of authorized devices accessing the administrative tenancy. Devices on the approved list may undergo compliance checks to ensure they meet organizational security policies, software patch levels, antivirus requirements, and configuration standards before being granted access to the administrative tenancy.

In one or more embodiments, approved devices may be equipped with endpoint security solutions, such as mobile device management or endpoint detection and response tools, to enforce security policies, monitor device activity, and detect and respond to security threats. The approved device list may be continuously or periodically reviewed and updated to reflect changes in device ownership, usage, or status. Devices that are lost, stolen, decommissioned, or no longer compliant with security standards are removed from the list. The approved device list may be integrated with device management platforms or systems, such as enterprise mobility management or unified endpoint management solutions, to streamline device provisioning, configuration, and monitoring processes. Approved devices may be required to use encryption technologies, e.g., device-level encryption or secure boot mechanisms, to protect sensitive data stored on the device and prevent unauthorized access in case of loss or theft. In the event of device loss or theft, administrators may have the ability to remotely wipe or lock approved devices to prevent unauthorized access to sensitive data and mitigate security risks.

In one or more embodiments, sovereignty requirements 1136 relate to the national security and cybersecurity, regulatory compliance, and jurisdictional authority and legal jurisprudence. Sovereignty requirements 1136 may include national security and cybersecurity regulations aimed at protecting critical infrastructure, sensitive government information, and national defense assets from cyber threats and foreign interference. Governments may impose cybersecurity standards, encryption requirements, or data access controls to safeguard national security interests and prevent unauthorized access to classified or sensitive information. Sovereignty requirements may encompass various regulatory compliance obligations imposed on organizations operating within a jurisdiction, including industry-specific regulations, financial regulations, and sector-specific compliance standards. Organizations must adhere to regulatory requirements, such as HIPAA in healthcare or PCI DSS (Payment Card Industry Data Security Standard) in the payment card industry, to protect sensitive data and ensure regulatory compliance. Sovereignty requirements 1136 reflect the legal authority and jurisdictional sovereignty of governments to regulate data handling practices, enforce laws, and adjudicate disputes within their territorial boundaries. Legal frameworks, court decisions, and international treaties define the scope of jurisdictional authority and establish the legal principles governing data sovereignty, territoriality, and jurisdictional conflicts.

In one or more embodiments, mappings 1138 relate to approved users, approved devices, sovereignty requirements, and access policies. Mappings 1138 ensure that user access to resources within the cloud infrastructure environment 1102 complies with sovereignty requirements and organizational policies. The mapping 1138 may include user-device mappings. These user-device mappings associate approved users with their approved devices (i.e., "map" the users to their respective devices) to ensure that only authorized devices are used to access resources. Sovereignty compliance mappings align access policies with sovereignty requirements to ensure that data sovereignty obligations are met when accessing resources within the cloud infrastructure environment 1102. Sovereignty compliance mappings include geo-location restrictions or data residency controls to comply with sovereignty requirements regarding the storage and processing of data. Granular access control mappings include access policies that enforce the principle of least privilege, granting users and devices access only to the resources necessary to perform their job functions. Granular access control mappings define role-based access RBAC or attribute-based access controls (ABAC) to tailor access permissions based on user roles, responsibilities, and data sensitivity.

In one or more embodiments, the operator device 1106 includes a computer, a tablet, a laptop, a desktop, a netbook, or other similar device. The operator device 1106 may be running client software to facilitate accessing the administrative tenancy 1112. The operator device 1106 may include a user interface 1140 and one or more security mechanism 1142.

In one or more embodiments, user interface 1140 refers to hardware and/or software configured to facilitate communications between a user and the administrative tenancy 1112. User interface 1140 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 1140 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 1140 is specified in one or more other languages, such as Java, C, or C++.

In one or more embodiments, the security mechanism 1142 includes hardware security devices. The hardware security devices may include Universal Serial Bus (USB) security keys, smart cards, trusted platform modules (TPM), biometric authentication devices, hardware encryption devices, and physical security keys. USB security keys, also known as hardware tokens or security tokens, are small physical devices that plug into a USB port of the operator device 1106. The USB security keys generate one-time passwords (OTPs) or cryptographic signatures for authentication and access control purposes. Examples of USB security keys include YubiKey, RSA SecurID, and Google Titan Security Key. Smart cards are credit card-sized plastic cards embedded with integrated circuits containing cryptographic processors and storage. Examples of smart cards include Common Access Cards used by the U.S. Department of Defense and Personal Identity Verification cards used by the U.S. government.

In one or more embodiments, the hardware security devices include biometric authentication devices, hardware encryption devices, and physical security keys. Biometric authentication devices use biometric characteristics, such as fingerprints, iris patterns, or facial features, for user authentication. Biometric authentication devices capture biometric data, verify the user's identity, and grant access based on biometric matching. Examples of biometric authentication devices include fingerprint scanners, iris scanners, and facial recognition cameras. Physical security keys are physical tokens or devices used for access control and physical security purposes, such as securing doors, cabinets, or equipment. Physical security keys may use mechanical keys, electronic keycards, or RFID tokens for authentication and access control. Examples of physical security keys include electronic access control systems, RFID key fobs, and proximity cards.

Figure 11B:
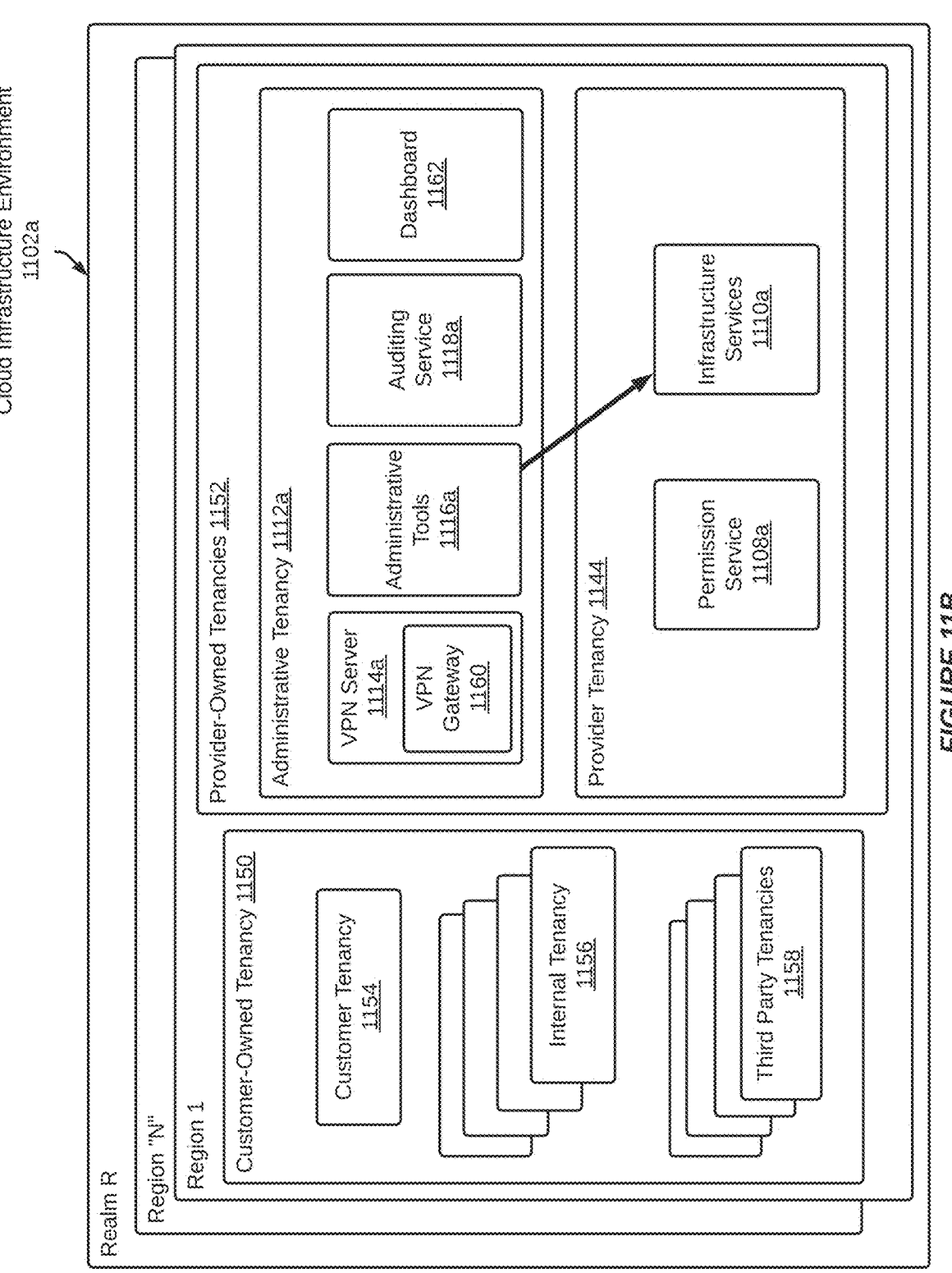

FIG. 11B illustrates a cloud infrastructure environment 1102a in accordance with one or more embodiments. As illustrated in FIG. 11B, the cloud infrastructure environment 1102 includes a realm, Realm R, including a first region, Region 1, and one or more additional regions, Region N. As detailed above, cloud regions are isolated from each other and a realm is a logical collection of one or more cloud regions. Realms are accessed separately from one another. Customers of a realm that includes a particular region are unable to traverse realm boundaries to a region outside that realm.

As illustrated in FIG. 11B, Region 1 includes a customer-owned tenancy 1150 and a provider-owned tenancy 1152. The customer-owned tenancy 1150 may include a customer tenancy 1154, one or more internal tenancies 1156, and one or more third party tenancies 1158. The customer-owned tenancy 1150 refers to tenancies owned by customers of the CSP, and the third party tenancies 1158 refer to tenancies owned by end users or clients of the customers of the CSP.

The provider-owned tenancy 1152 may include an administrative tenancy 1112a and a provider tenancy 1144. The provider tenancy 1144 may include a permissions service 1108a, and infrastructure services 1110a. The administrative tenancy 1112a may include a VPN server 1114a, administrative tools 1116a, an auditing service 1118a, and a dashboard 1162. The VPN server 1114a includes a VPN gateway 1160. As indicated by the arrow emanating from the administrative tools 1116a hosted in the administrative tenancy 1112a, a user communicates with the infrastructure services 1110a hosted outside of the administrative tenancy 1112a using the administrative tools 1116a. User access to the infrastructure services 1110a is limited to through the administrative tenancy 1112a.

4. ACCESSING CLOUD ENVIRONMENTS THROUGH AN ADMINISTRATIVE TENANCY TO COMPLY WITH SOVEREIGNTY REQUIREMENTS

FIG. 12 illustrates an example set of operations for accessing a customer cloud environment through an administrative tenancy to comply with sovereignty requirements in accordance with one or more embodiments. One or more operations illustrated in FIG. 12 may be modified, rearranged, or omitted all together. Accordingly, the particular sequence of operations illustrated in FIG. 12 should not be construed as limiting the scope of one or more embodiments.

One or more embodiments receive request from a user to access an administrative tenancy in a customer cloud environment (Operation 1202). The administrative tenancy may include a VPN server that receives the access request from a user. The administrative tenancy may be the sole authorized mechanism for the user to access the customer cloud environment. The request for access may be made by the user from a device in a geographic location. The request may include authentication information from the user and/or the user device. The request may also include a list of the one or more resources that the user is requesting to access in the cloud infrastructure environment. The user device may be running client software for facilitating the making of the request.

One or more embodiments determine if the user meets the applicable sovereignty requirement(s) for accessing the administrative tenancy (Operation 1204). The VPN server may include a sovereignty verification service that identifies sovereignty requirements applicable to the cloud environment that the user is requesting access. Sovereignty requirements for the cloud environment may be maintained in a database. Using the identified sovereignty requirements, the sovereignty verification services determines if the user meets the sovereignty requirements for accessing the cloud infrastructure environment. Determining that the user satisfies the sovereignty requirement may include performing a geographic location check based on a physical location of the user. The geographic location check may include verifying that the source IP address associated with the user belongs to a preconfigured CIDR range corresponding to a preapproved geographic region. Sovereignty verification may further confirm that the source IP address is not associated with known VPN and Tor services.

In one or more embodiments, in addition to confirming that the sovereignty requirements are met, the VPN server authenticates the identity of the user and authenticates the user device. Alternatively, user and user device authentication may be performed by a permissions service in communication with to the VPN server. User authentication may occur on an ongoing basis. Authentication of the user on an ongoing basis may include performing two-factor authentication on an ongoing basis. Authentication may be performed at regular intervals or in response to detecting an authentication trigger.

In some embodiments, after successful authentication, the VPN server or other permissions service performs an authorization check to determine if the user has permission to access the requested resources. Authorization involves evaluating the permissions of the user, roles, and access policies to determine if the operator has the necessary rights to access the requested resources or perform the requested operations.

One or more embodiments deny the request for access (Operation 1206) if the sovereignty verification service is unable to confirm that the sovereignty requirements for the cloud infrastructure environment are met. Similarly, access may be denied if the authentication service is unable to authenticate either or both of the user and the user device, and/or when the system determines that the user is not authorized to use the requested resources.

One or more embodiments permit user access to the administrative tenancy (Operation 1208) if sovereignty requirements are met and the authentication service is able to authenticate the user and the user device. The VPN server provisions the necessary access permissions for the user. The provisioning may involve configuring user accounts, setting up authentication mechanisms, and granting privileges to access the requested resources. Once access has been provisioned through the VPN server, the system may notify the operator that the access request is approved. The system may transmit, to the operator, instructions on how to access the requested resources within the customer cloud environment.

In one or more embodiments, a first user has access to a first set of resources and a second user has access to a second set of resources different from the first set of resources. The resources available to a user may be determined by consulting a permissions database or access policies. The principle of least privilege may be applied to the resources made available to the user, to limit the actions the user may perform. Limiting user actions to a particular set of resources prevents or reduces the potential for unauthorized or nefarious activity. More particularly, when a user does not have access to a resource, the user is unable to access that resource.

One or more embodiments use administrative tools in the administrative tenancy to make authenticated calls to services operating outside of the administrative tenancy (Operation 1210). The administrative tools available to the user in the administrative tenancy are determined based on permissions for the user. Using the available administrative tools, the user is able to make authenticated calls (i.e., provide user input that causes the system to make authenticated calls) to one or more services operating outside of the administrative tenancy. Alternatively, the user may access the services outside the administrative tenancy using a dashboard or management console provided to the user.

One or more embodiments receive a command to disable user access to the administrative tenancy (Operation 1212). The command to disable user access may be received in response to an administrator clicking on an interface feature of a customer dashboard. Alternatively, the command may be received as an API call made by the administrator. The command may include various parameters, such as the type of resources to be affected, the specific users or roles whose access should be disabled, and any other relevant information.

One or more embodiments, responsive to receiving the command, disable user access to the administrative tenancy (Operation 1214). The action to disable user access may involve updating access control configurations, revoking authentication tokens or credentials, and/or modifying permissions or roles associated with the affected resources. This may include placing a flag or other notation in the permissions database for the affected user and/or resources. One or more of these actions may trigger re-authentication of the user and user device. Attempts to re-authenticate the user and/or user device will fail, thereby causing the user access to the administrative tenancy, and thus, the cloud infrastructure environment, to be terminated. As long as the actions that disabled user access remain in effect, the user will be unable to access the administrative tenancy.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 13:
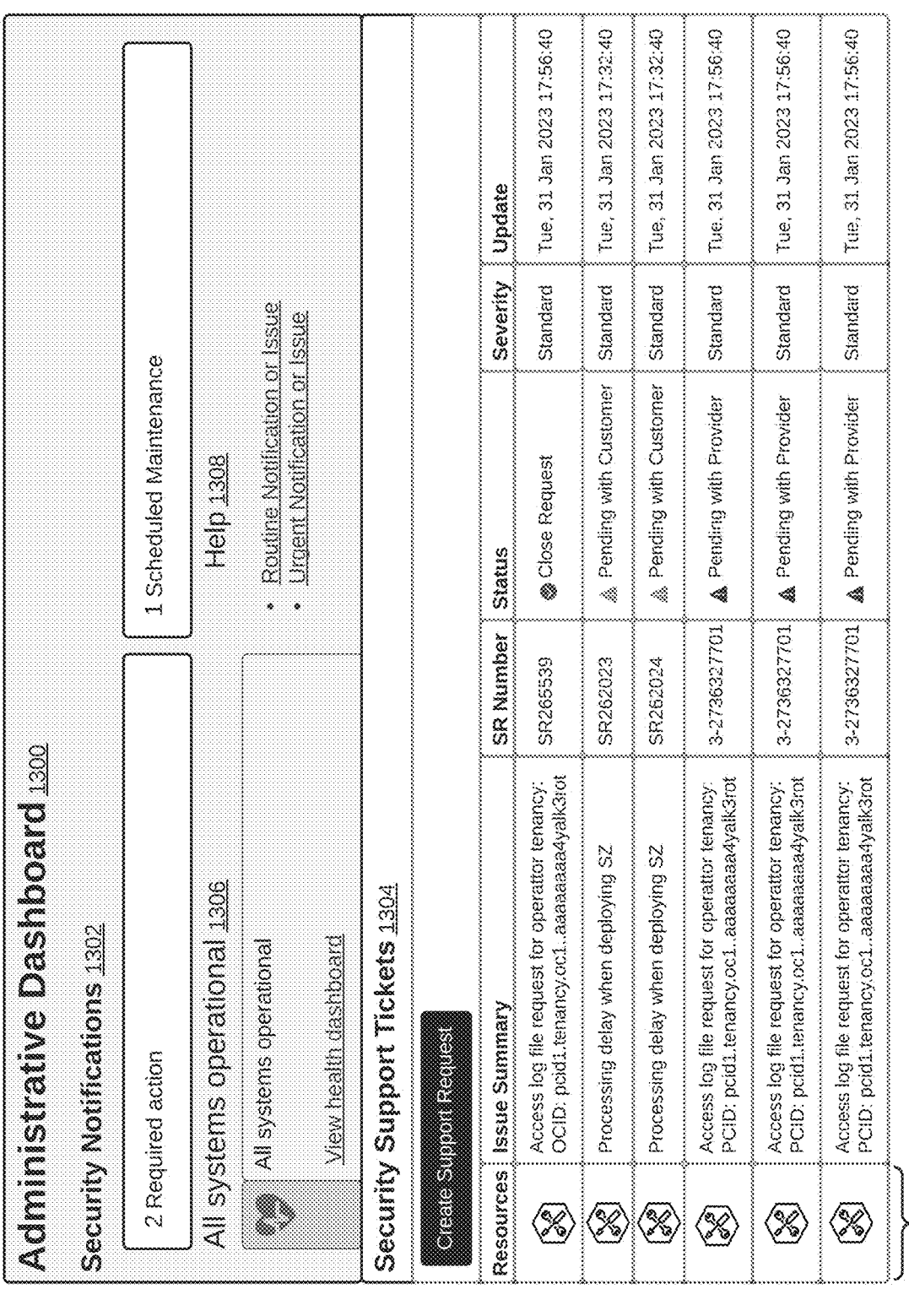
FIG. 13 illustrates an example of an administrative dashboard in accordance with one or more embodiments.

FIG. 13 illustrates a dashboard provided to the users associated with the cloud service provider. As shown, the administrative dashboard 1300 provides users with information related to the infrastructure security of the cloud infrastructure environment and resources for connecting with one or more services in the cloud infrastructure environment. More particularly, the administrative dashboard 1300 includes interfaces for providing security notifications 1302 and security support tickets 1304. The administrative dashboard 1300 includes interfaces 1306 for viewing operational status of the systems and interfaces 1308 for providing access to services for addressing system status issues. The administrative dashboard 1300 also provides interfaces 1310 for accessing administrative tools for resolving issues.

6. PRACTICAL APPLICATIONS, ADVANTAGES & IMPROVEMENTS

The use of administrative tenancy to access cloud environments facilitates governance and accountability by providing audit trails, logging capabilities, and reporting tools to monitor user activities, track changes, and demonstrate compliance with sovereignty requirements. Automated tools and processes implemented within the administrative tenancy allow organization to perform real-time compliance checks and validations against sovereignty requirements, permitting the organizations to proactively address compliance issues.

The use of an administrative tenancy to access cloud environments prevents or severely limits malicious activity as the administrative tools provided to users in the administrative tenancy are limited to the tools required to resolve particular issues. Providing administrative tools to users through the administrative tenancy, as opposed to locally on a user device, ensures that the tools used by the user to communicate with the services outside the administrative tenancy are up-to-date and that users access is to same versions of the tools.

Limiting user access to cloud environments to the administrative tenancy centralizes administrative control of user access to the customer cloud resources, including terminating existing access.

7. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
receiving, in a cloud environment, a request for a first user to access one or more administrative tools in an administrative tenancy;
  wherein the administrative tenancy is one of a plurality of tenancies in the cloud environment;
  wherein the administrative tenancy comprises the one or more administrative tools for communicating with one or more services that are running outside of the administrative tenancy;
determining that the first user satisfies a sovereignty requirement for the cloud environment,
  wherein determining that the first user satisfies the sovereignty requirement comprises performing a geographic location check based on a physical location of the first user,
  wherein performing the geographic location check comprises determining if a source Internet Protocol (IP) address associated with the first user belongs to a preconfigured Classless Inter-Domain Routing (CIDR) range corresponding to a preapproved geographic region; and
  based at least on determining that the first user satisfies the sovereignty requirement: granting the request for the first user to access the one or more administrative tools in the administrative tenancy;
wherein the method is performed by at least one device including a hardware processor.

2. The method of claim 1, wherein the one or more services running outside of the administrative tenancy are not otherwise accessible by the first user.

3. The method of claim 1, wherein:
the cloud environment comprises a set of cloud resources;
the set of cloud resources comprises the one or more administrative tools and the one or more services running outside of the administrative tenancy; and
access to the set of cloud resources is controlled by a set of access policies, each of the set of access policies having a maximum scope of one of the plurality of tenancies.

4. The method of claim 1:
wherein a set of one or more access policies allows access by the first user to the one or more administrative tools in the administrative tenancy;
wherein the set of one or more access policies specifies one or more of allowing or admitting a static or dynamic group of users comprising the first user to access a static or dynamic group of cloud resources comprising the one or more administrative tools in the administrative tenancy.

5. The method of claim 1, wherein no access policy allows access by the first user directly to the one or more services running outside of the administrative tenancy.

6. The method of claim 1, wherein:
the administrative tenancy is operated by a cloud service provider (CSP);
the one or more services running outside of the administrative tenancy is customer-operated;
the one or more services run in one or more tenancies, of the plurality of tenancies, that are each customer-operated; and
the first user is associated with the CSP.

7. The method of claim 1, wherein receiving the request is performed by a virtual private network (VPN) gateway associated with the administrative tenancy.

8. The method of claim 1:
wherein the cloud environment comprises a plurality of partitions;
wherein a first partition of the plurality of partitions comprises the administrative tenancy and is subject to the sovereignty requirement;
wherein access to a second administrative tenancy, in a second partition of the plurality of partitions, is not subject to the sovereignty requirement.

9. The method of claim 1, further comprising:
authenticating the first user on an ongoing basis during use of the administrative tenancy.

10. The method of claim 9, wherein authenticating the first user on an ongoing basis comprises performing two-factor authentication, on an ongoing basis, responsive to detecting a plurality of instances of one or more authentication triggers.

11. The method of claim 1, further comprising:
determining one or more of (a) that the first user is on a pre-approved list of operators or (b) that the first user is not on a list of forbidden operators.

12. The method of claim 1, further comprising:
detecting a presence of a hardware security device coupled to a physical device used by the first user to access the administrative tenancy.

13. The method of claim 12, wherein the hardware security device is a hardware dongle.

14. The method of claim 1, wherein the one or more administrative tools available to the first user in the administrative tenancy is based on a first configuration specific to the first user.

15. The method of claim 14, wherein a second user has access to at least one administrative tool not included in the one or more administrative tools available to the first user, based on a second configuration specific to the second user.

16. The method of claim 1, further comprising:
maintaining an audit log of (a) access by the first user to the administrative tenancy and (b) actions taken by the first user within the administrative tenancy.

17. One or more non-transitory computer-readable media storing instructions which, when executed by one or more hardware processors, cause performance of operations comprising:
receiving, in a cloud environment, a request for a first user to access an administrative tenancy;
  wherein the administrative tenancy is one of a plurality of tenancies in the cloud environment;

wherein the administrative tenancy comprises one or more administrative tools for communicating with one or more services that are running outside of the administrative tenancy;

determining that the first user satisfies a sovereignty requirement for the cloud environment;

wherein determining that the first user satisfies the sovereignty requirement comprises performing a geographic location check based on a physical location of the first user, wherein performing the geographic location check comprises determining if a source Internet Protocol (IP) address associated with the first user belongs to a preconfigured Classless Inter-Domain Routing (CIDR) range corresponding to a preapproved geographic region; and based at least on determining that the first user satisfies the sovereignty requirement: granting the request for the first user to access the administrative tenancy;

wherein the first user uses the one or more administrative tools in the administrative tenancy to make authenticated calls to the one or more services running outside of the administrative tenancy.

18. A system comprising:

one or more hardware processors;

one or more non-transitory computer-readable media; and program instructions stored on the one or more non-transitory computer-readable media which, when executed by the one or more hardware processors, cause the system to perform operations comprising:

receiving, in a cloud environment, a request for a first user to access an administrative tenancy;

wherein the administrative tenancy is one of a plurality of tenancies in the cloud environment;

wherein the administrative tenancy comprises one or more administrative tools for communicating with one or more services that are running outside of the administrative tenancy;

determining that the first user satisfies a sovereignty requirement for the cloud environment, wherein determining that the first user satisfies the sovereignty requirement comprises performing a geographic location check based on a physical location of the first user, wherein performing the geographic location check comprises determining if a source Internet Protocol (IP) address associated with the first user belongs to a preconfigured Classless Inter-Domain Routing (CIDR) range corresponding to a preapproved geographic region; and based at least on determining that the first user satisfies the sovereignty requirement: granting the request for the first user to access the administrative tenancy;

wherein the first user uses the one or more administrative tools in the administrative tenancy to make authenticated calls to the one or more services running outside of the administrative tenancy.

* * * * *